US012583107B2

(12) United States Patent
Takano et al.

(10) Patent No.: US 12,583,107 B2
(45) Date of Patent: Mar. 24, 2026

(54) TEMPORAL LOGIC FORMULA GENERATION DEVICE, TEMPORAL LOGIC FORMULA GENERATION METHOD, AND STORAGE MEDIUM

(71) Applicant: NEC Corporation, Tokyo (JP)

(72) Inventors: Rin Takano, Tokyo (JP); Hiroyuki Oyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 455 days.

(21) Appl. No.: 18/029,261

(22) PCT Filed: Oct. 9, 2020

(86) PCT No.: PCT/JP2020/038297
§ 371 (c)(1),
(2) Date: Mar. 29, 2023

(87) PCT Pub. No.: WO2022/074824
PCT Pub. Date: Apr. 14, 2022

(65) Prior Publication Data
US 2023/0364791 A1 Nov. 16, 2023

(51) Int. Cl.
*B25J 9/16* (2006.01)
*B25J 13/08* (2006.01)

(52) U.S. Cl.
CPC ........... *B25J 9/1664* (2013.01); *B25J 13/089* (2013.01); *G05B 2219/40519* (2013.01)

(58) Field of Classification Search
CPC ................. B25J 9/1664; B25J 13/089; G05B 2219/40519
See application file for complete search history.

(56) References Cited

U.S. PATENT DOCUMENTS

| | | | |
|---|---|---|---|
| 9,689,696 B1 * | 6/2017 | Russell | G05D 1/0287 |
| 10,671,076 B1 * | 6/2020 | Kobilarov | G08G 1/166 |
| 10,691,127 B2 * | 6/2020 | Kobilarov | G05D 1/0088 |

(Continued)

FOREIGN PATENT DOCUMENTS

| | | |
|---|---|---|
| JP | H05-241838 A | 9/1993 |
| JP | H07-072787 A | 3/1995 |

(Continued)

OTHER PUBLICATIONS

International Search Report for PCT Application No. PCT/JP2020/038297, mailed on Dec. 15, 2020.

*Primary Examiner* — Sohana Tanju Khayer
(74) *Attorney, Agent, or Firm* — Sughrue Mion, PLLC

(57) ABSTRACT

The temporal logic formula generation device 1X mainly includes a target relation logical formula generation means 331X and a target relation logical formula integration means 332X. The target relation logical formula generation means 331X is configured to generate, based on object-to-object relation information representing a relation between objects in a target state relating to a task of the robot, one or more target relation logical formulas that are temporal logic formulas representing relations, in the target state, between respective pair(s) of objects between which the relation is defined. The target relation logical formula integration means 332X is configured to generate a temporal logic formula into which the target relation logical formulas are integrated.

9 Claims, 16 Drawing Sheets

(56)　　　　　　References Cited

U.S. PATENT DOCUMENTS

| 11,577,722 | B1 * | 2/2023 | Packer | ................. | G05D 1/0088 |
| 2014/0282586 | A1 * | 9/2014 | Shear | .................... | G06F 16/245 |
| | | | | | 718/104 |
| 2018/0085922 | A1 * | 3/2018 | Ooba | ..................... | B25J 9/1679 |
| 2019/0351542 | A1 * | 11/2019 | Buerger | ................. | B25J 9/0084 |
| 2020/0276699 | A1 * | 9/2020 | Buerger | ................. | B25J 9/1664 |
| 2021/0001481 | A1 * | 1/2021 | Hayashi | ................... | B25J 9/163 |
| 2021/0252714 | A1 * | 8/2021 | Hayashi | .................... | B25J 9/10 |
| 2023/0289281 | A1 * | 9/2023 | Redford | ............. | G06F 11/3698 |

FOREIGN PATENT DOCUMENTS

| JP | 2010-152528 | A | 7/2010 |
| JP | 2018-051684 | A | 4/2018 |
| JP | 2019-200792 | A | 11/2019 |
| WO | 2008/123021 | A2 | 10/2008 |

* cited by examiner

100 : ROBOT CONTROL SYSTEM

APPLICATION INFORMATION

ENVIRONMENTAL OBJECT INFORMATION　I1

GENERAL CONSTRAINT CONDITION INFORMATION　I2

OPERATIONAL OBJECT INFORMATION　I3

SKILL DATABASE　I4

SKILL INFORMATION

SKILL IDENTIFICATION LABEL

SKILL EXECUTION INFORMATION

SKILL CONTROL COMMAND INFORMATION

Figure 4:
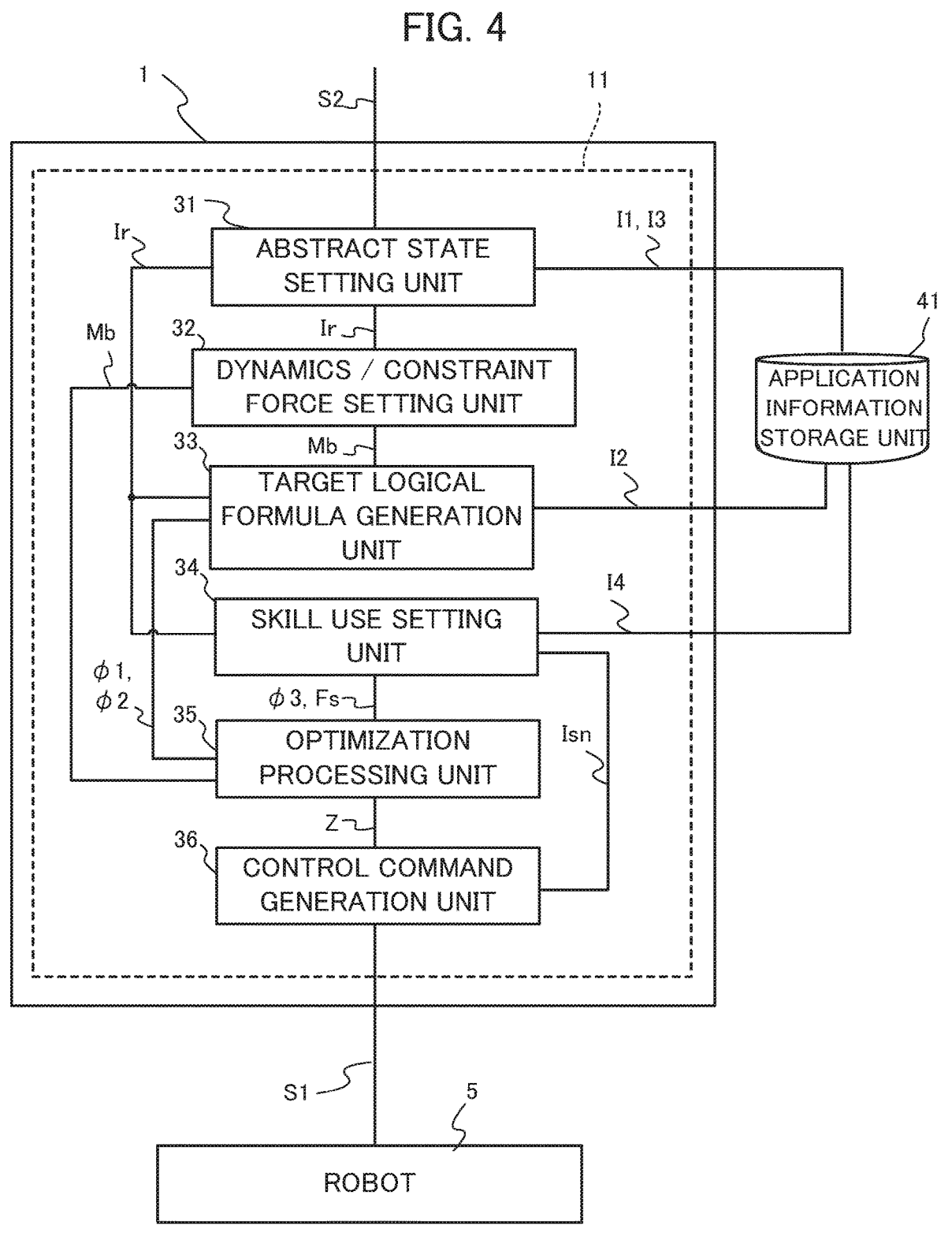

ABSTRACT STATE
SETTING UNIT

I1, I3

Mb

32

Ir

DYNAMICS / CONSTRAINT
FORCE SETTING UNIT

41

APPLICATION
INFORMATION
STORAGE UNIT

33

Mb

TARGET LOGICAL
FORMULA GENERATION
UNIT

I2

34

SKILL USE SETTING
UNIT

I4

$\phi 1$,
$\phi 2$

35

$\phi 3$, Fs

OPTIMIZATION
PROCESSING UNIT

Isn

Z

36

CONTROL COMMAND
GENERATION UNIT

S1

5

ROBOT

START

S11

ACQUIRE NECESSARY SKILL INFORMATION
FROM SKILL DATABASE

S12

GENERATE
SKILL TUPLE BASED ON ACQUIRED SKILL INFORMATION

S13

GENERATE
SKILL USE OPEARTION COMMAND

S14

GENERATE
SKILL USE EVALUATION FUNCTION

END

FIG. 11

| $k$ | 0 | 1 | 2 | 3 | 4 | 5 | 6 | 7 | 8 | 9 |
|---|---|---|---|---|---|---|---|---|---|---|
| $u_{s1}$ | 0 | 1 | 0 | 0 | 0 | 0 | 0 | 0 | 0 | 0 |
| $u_{s2}$ | 0 | 0 | 0 | 0 | 0 | 0 | 0 | 1 | 0 | 0 |
| Idx | 0 | 1 | 1 | 1 | 0 | 0 | 0 | 2 | 2 | 2 |

1Y:OPERATION COMMAND GENERATION DEVICE

341Y — SKILL INFORMATION ACQUISITION MEANS

342Y — SKILL TUPLE GENERATION MEANS

343Y — SKILL USE OPERATION COMMAND GENERATION MEANS

1

TEMPORAL LOGIC FORMULA GENERATION DEVICE, TEMPORAL LOGIC FORMULA GENERATION METHOD, AND STORAGE MEDIUM

This application is a National Stage Entry of PCT/JP2020/038297 filed on Oct. 9, 2020, the contents of all of which are incorporated herein by reference, in their entirety.

TECHNICAL FIELD

The present disclosure relates to the technical field of a temporal logic formula generation device, a temporal logic formula generation method, and a storage medium for generating a temporal logic formula relating to motion planning of a robot.

BACKGROUND ART

There is proposed a control method for controlling a robot to execute the task when there is given a task to cause the robot to work on. For example, Patent Literature 1 discloses a robot control device configured to determine, when a robot grasps by its hand a plurality of objects and houses them in a container, possible sequences of the objects to be grasped by the hand and to determine the sequence of the objects to be housed based on an index calculated for each possible order. Further, Patent Literature 2 discloses a computer program for generating a temporal logic formula representing the feature of the system based on the order information indicating the sequence.

CITATION LIST

Patent Literature

Patent Literature 1: JP 2018-51684A
Patent Literature 2: WO 2008/123021

SUMMARY

Problem to be Solved

When performing a motion planning of a robot using temporal logic for a complicated task associated with joining multiple objects or contact of multiple objects such as an assembling task of parts, it is necessary to accurately generate a temporal logic formula indicative of the necessary motions. Patent Literature 1 and Patent Literature 2 are silent on the generation of such a temporal logic formula.

In view of the above-described issue, it is therefore an example object of the present disclosure to provide a temporal logic formula generation device, a temporal logic formula generation method, and a storage medium capable of suitably generating a temporal logic formula required for a motion planning of a robot.

Means for Solving the Problem

In one mode of the temporal logic formula generation device, there is provided a temporal logic formula generation device including:

a target relation logical formula generation means configured to generate, based on object-to-object relation information representing a relation between objects in a target state relating to a task of the robot,

target relation logical formulas that are temporal logic formulas representing relations, in the target state, between respective pair(s) of objects between which the relation is defined; and a target relation logical formula integration means configured to generate a temporal logic is formula into which the target relation logical formulas are integrated.

In one mode of the temporal logic formula generation method, there is provided a temporal logic formula generation method including:

generating, based on object-to-object relation information representing a relation between objects in a target state relating to a task of the robot, target relation logical formulas that are temporal logic formulas representing relations, in the target state, between respective pair(s) of objects between which the relation is defined; and generating a temporal logic formula into which the target relation logical formulas are integrated.

In one mode of the storage medium, there is provided a storage medium storing a program executed by a computer, the program causing the computer to:

generate, based on object-to-object relation information representing a relation between objects in a target state relating to a task of the robot, target relation logical formulas that are temporal logic formulas representing relations, in the target state, between respective pair(s) of objects between which the relation is defined; and generate a temporal logic formula into which the target relation logical formulas are integrated.

Effect

An example advantage according to the present invention is to suitably generate a temporal logic formula used in a motion planning of a robot.

BRIEF DESCRIPTION OF THE DRAWINGS

FIG. 4 It shows an example of a functional block of the robot controller.

FIG. 11 It shows a time series relation among the time step, the skill input sequence of the first skill, the skills input sequence of the second skills, and the index used for identifying the state sub-sequence.

EXAMPLE EMBODIMENTS

Hereinafter, example embodiments of a control device, a control method, and a storage medium will be described with reference to the drawings.

First Example Embodiment

(1) System Configuration

Figure 1:
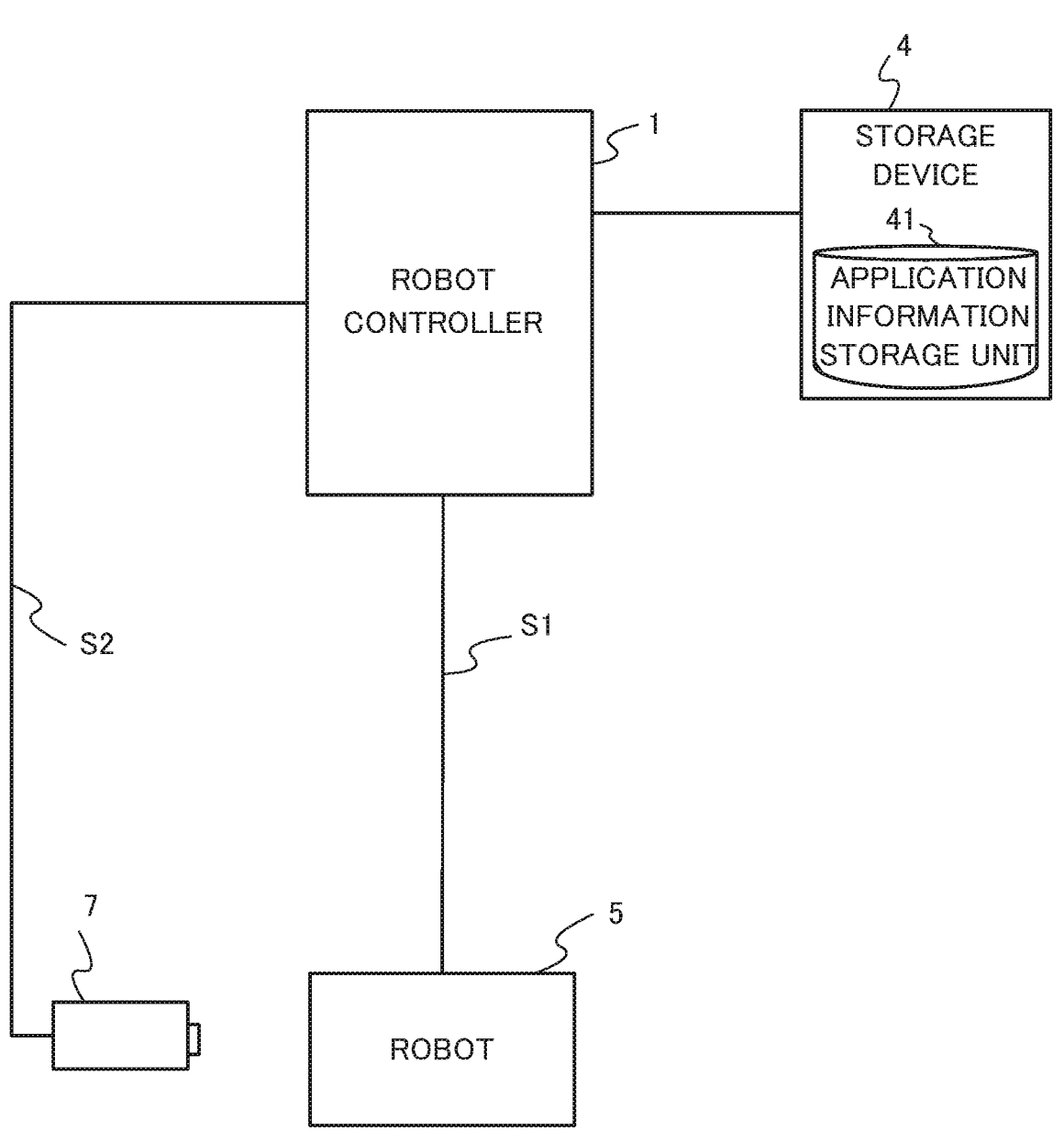
FIG. 1 It shows a configuration of a robot control system in a first example embodiment.

FIG. 1 shows a configuration of a robot control system 100 according to the first example embodiment. The robot control system 100 mainly includes a robot controller 1, a storage device 4, a robot 5, and a measurement device 7. The robot control system 100 causes a robot 5 to perform a task associated with join (including contact, hereinafter the same) between objects or release thereof.

The robot controller 1 performs a motion planning of the robot 5, generates a control command "S1" for causing the robot 5 to execute the planned operation (motion), and supplies the control command S1 to the robot 5. In this case, the robot controller 1 converts a task (also referred to as "objective task") to be executed by the robot 5 into a sequence of simple tasks that the robot 5 can accept with respect to each time step. Then, the robot controller 1 controls the robot 5 based on the control command S1 that is an execution command of the generated sequence. In the present example embodiment, the objective task is set to a task associated with at least either joining objects or releasing (unjoining) the joined objects (simply referred to as "join and release"). It is noted that "join" includes, for example, an operation to screw objects to each other, an operation to fit objects to each other, or an operation to stack objects.

In addition, the robot controller 1 performs data communication with the storage device 4, the robot 5, and the measurement device 7 through a communication network or through direct wireless or wired communication. For example, the robot controller 1 receives from the storage device 4 the information required to generate the control command S1. Further, the robot controller 1 receives a measurement signal "S2" from the measurement device 7.

The storage device 4 includes an application information storage unit 41. The application information storage unit 41 stores application information necessary for formulating a motion planning of the robot 5 (i.e., for generating a sequence to be executed by the robot 5). Details of the application information will be described later with reference to FIG. 3. The storage device 4 may be an external storage device, such as a hard disk, connected or embedded in the robot controller 1, or may be a storage medium, such as a flash memory. The storage device 4 may be a server device that performs data communication with the robot controller 1 via a communication network. In this case, the storage device 4 may be configured by a plurality of server devices.

The robot 5 performs tasks relating to the objective task based on the control command S1 supplied from the robot controller 1. The robot 5 is, for example, one or more robots operating in an assembly factory, a food factory, or any other factory, or any logistics site. The robot 5 may be a vertical articulated robot, a horizontal articulated robot, or any other type of robot. The robot 5 may supply a state signal indicating the state of the robot 5 to the robot controller 1. The state signal may be an output signal from the sensor for detecting the state (position, angle, and the like) of the entire robot 5 or a specific part thereof such as a joint, or may be a signal indicating the progress of the operation of the robot 5.

The measurement device 7 is one or more sensors to detect a state of the workspace in which an objective task is performed and examples thereof include a camera, a range sensor, a sonar, and a combination thereof. The measurement device 7 supplies the generated measurement signal S2 to the robot controller 1. Examples of the measurement device 7 include a self-propelled sensor or a flying sensor (including a drone) which moves within a workspace, one or more sensors provided on the robot 5, one or more sensors provided on other objects in the workspace, and one or more sensors that detect sound in the workspace. As such, the measurement device 7 may include a variety of sensors that detect the state of the workspace, and may include sensors located anywhere.

The configuration of the robot control system 100 shown in FIG. 1 is an example, and various changes may be made to the configuration. For example, the robot 5 may be plural robots, or may include plural targets to be controlled to operate independently such as robot arms. Even in these cases, the robot controller 1 transmits the control command S1 for performing the objective task with respect to each robot 5 (or each target to be controlled), and transmits the control signal S3 to each robot 5. Further, the robot 5 may perform cooperative work with other robots, workers, or machine tools that operate in the workspace. The measurement device 7 may be a part of the robot 5. Further, the robot controller 1 may be configured by a plurality of devices. In this case, the plurality of devices constituting the robot controller 1 exchange information necessary to execute the process assigned in advance with one another. Further, the robot controller 1 and the robot 5 may be integrally configured.

(2) Hardware Configuration

Figure 2:
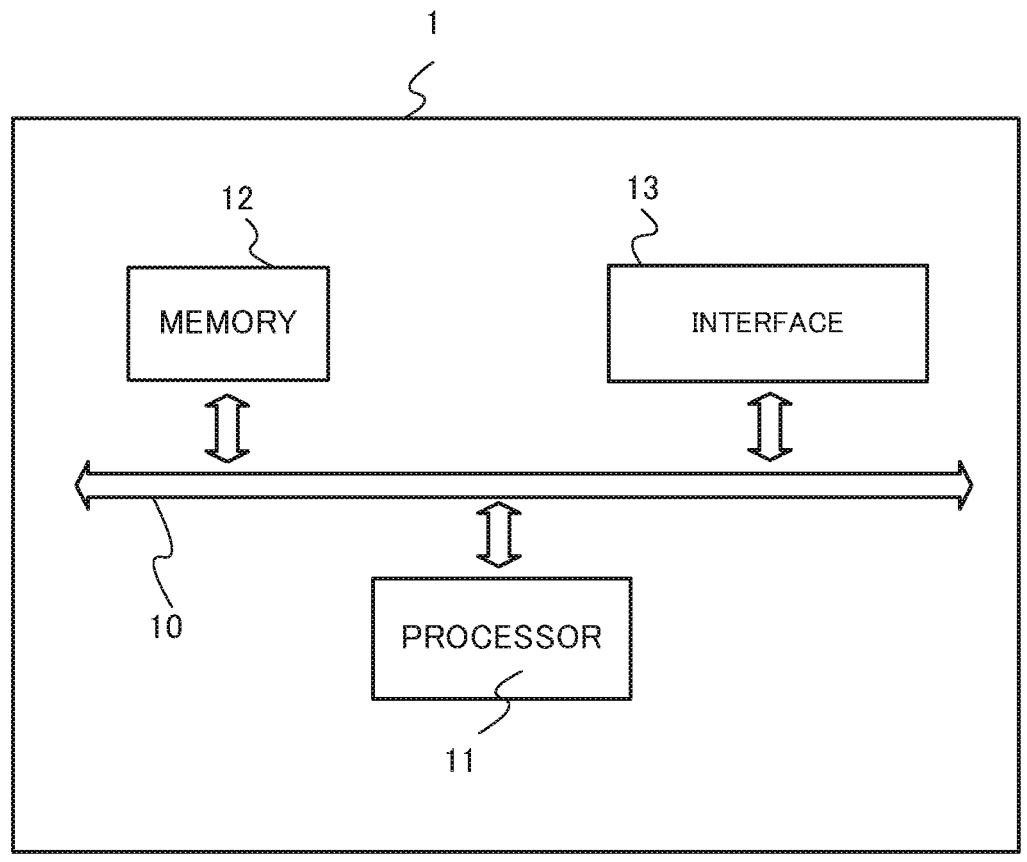
FIG. 2 It shows the hardware configuration of a robot controller.

FIG. 2 shows a hardware configuration of the robot controller 1. The robot controller 1 includes a processor 11, a memory 12, and an interface 13 as hardware. The processor 11, the memory 12 and the interface 13 are connected via a data bus 10.

The processor 11 functions as a controller (arithmetic unit) for performing overall control of the robot controller 1 by executing a program stored in the memory 12. The processor 11 is, for example, a CPU (Central Processing Unit), a GPU (Graphics Processing Unit), a TPU (Tensor Processing Unit) or the like. The processor 11 may be configured by a plurality of processors. The processor 11 is an example of a computer.

The memory 12 is a variety of volatile and non-volatile memories, such as a RAM (Random Access Memory), a ROM (Read Only Memory, and a flash memory. Further, in the memory 12, a program for the robot controller 1 to execute a process is stored. A part of the information stored in the memory 12 may be stored by one or more external storage devices (for example, the storage device 4) capable of communicating with the robot controller 1, or may be stored by a storage medium detachably attached to the robot controller 1.

The interface 13 is one or more interfaces for electrically connecting the robot controller 1 and other devices. Examples of the interfaces include a wireless interface, such as network adapters, for wirelessly transmitting and receiving data to and from other devices, a hardware interface, such as cables, for connecting to other devices. For example, the interface 13 may perform an interface operation with an input device that receives user input (external input) such as a touch panel, a button, a keyboard, and a voice input device, a display device such as a display and a projector, and a sound output device such as a speaker.

The hardware configuration of the robot controller 1 is not limited to the configuration shown in FIG. 2. For example, the robot controller 1 may incorporate at least any of a display device, an input device, or a sound output device. The robot controller 1 may be configured to include the storage device 4.

(3) Application Information

Next, a data structure of the application information stored in the application information storage unit 41 will be described.

Figure 3:
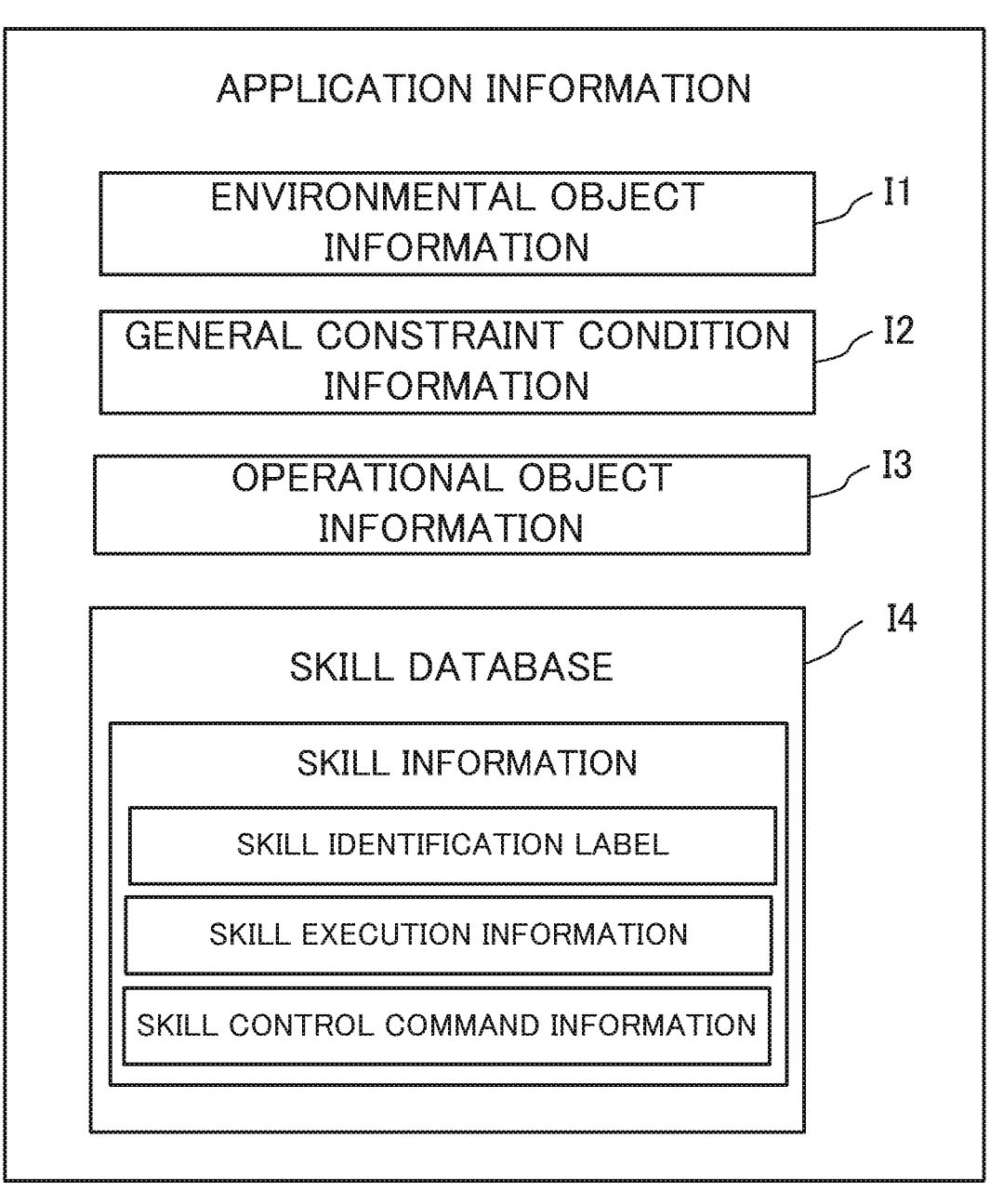
FIG. 3 It shows an example of the data structure of application information.

FIG. 3 shows an example of the data structure of the application information necessary for the motion planning of the robot 5 for executing the objective task. As illustrated in FIG. 3, the application information includes environmental object information I1, general constraint condition information I2, operational object information I3, and a skill database I4.

An environmental object information I1 is information on an object (also referred to as "environmental object") existing as an environment in the workspace. Specifically, the environmental object is one or more objects (for example, an obstacles) that do not correspond to any of a target object (also referred to as "operational object") of operation by the robot 5, the robot 5, and a reference object (for example, a work table) defined as a reference coordinate system used by the robot controller 1. For example, the environmental object information I1 may include various information indicating an attribute and a state of the environmental object such as the type of the environmental object, the position and posture of the environmental object, and the like. The environmental object information I1 may be information generated in advance based on an input (external input) from the user, or may be information that represents the latest state of the environmental object that is recognized based on the measurement signal S2 or the like. The generation or updating of the environmental object information I1 may be performed by the robot controller 1 or may be performed by another device.

The general constraint condition information I2 indicates the general constraint conditions when executing the objective task. When the objective task is pick-and-place, examples of the constraint condition indicated by the general constraint condition information I2 include a constraint condition that the robot 5 (robot arm) should not be in contact with an obstacle and a constraint condition that the robots 5 (robot arm) should not be in contact with each other.

The operational object information I3 is information on an operational object that is a target of operation by the robot 5 in the objective task. Examples of the operational object information I3 includes information indicating the attribute and state of the operational object, and information relating to physical relation (also called "object-to-object relation") between objects including the operational object. The information indicating the attribute and the state of the operational object may be information generated in advance based on an input (external input) from the user, or may be information representing the latest state of the operational object recognized based on the measurement signal S2 or the like. The generation or updating of the operational object information I3 may be performed by the robot controller 1 or may be performed by any other device. The information on the object-to-object relation is, for example, pre-generated based on the input (external input) from the user, and stored in the storage device 4.

The skill database I4 is a database relating to skills each of which is an operation-specific module of a particular operation of the robot 5. The record for each skill registered in the skill database I4 is also referred to as "skill information". The skill information abstractly represent each operation regarding join and release, and it contains various information necessary for executing the skill. The skill information mainly includes a label (also referred to as "skill identification label") that identifies the skill, information (also referred to as "skill execution information") on execution of skills, and information (also referred to as "skill control command information") on the generation of the control command for execution of the skill. The above-mentioned information is described in detail in the section "(8-1) Data Structure of Skill Information". In addition to skills corresponding to various operations for join and release, skills corresponding to basic operations (e.g., grasping an object or releasing an object) of the robot 5 other than join and release may be registered in the skills database I4.

The application information may include various information necessary for the motion planning of the robot 5 in addition to the above-described information.

For example, the application information may include object model information relating to the object models of the respective objects (for example, the robot 5, the operational object, the environmental object, and the reference object) to be recognized from the measurement signal S2 generated by the measurement device 7. In this case, the object model information may include information necessary for the robot controller 1 to recognize the type, the position, the posture, and the ongoing operation of each of the above-described objects. In this case, the object model information includes parameters of an inference engine obtained by training a learning model in machine learning such as a neural network, for example. For example, the inference engine is learned in advance so as to output, when an image is inputted thereto, the type, the position, and the posture of an object in the inputted image.

In another example, the application information may include information (e.g., information regarding position, range, tilt, and the like) on a reference object, such as a worktable, which is defined as a reference coordinate system to be used by the robot controller 1. In yet another example, the application information may include information necessary to define an abstract state of objects existing in the workspace. In yet another example, the application information may include information on an operational limit (e.g., the upper limit of the speed, acceleration, or angular velocity of the robot 5) of the robot 5 to which control is performed by the robot controller 1. The information on the operational limit may be information defining the operational limit for each movable part or joint of the robot 5.

(4) Process Overview

Next, a description will be given of the process outline of the robot controller 1. Schematically, the robot controller 1 generates the control command S1 by setting the evaluation function and the constraint conditions to be satisfied in the objective task associated with join and release based on a predefined object-to-object relation, skill information, and performs an optimization process using them. Thereby, the robot controller 1 suitably performs the motion planning of the robot 5 for an objective task associated with join and release, and suitably controls the robot 5 so as to execute the objective task.

FIG. 4 is an example of a functional block showing an outline of the process to be executed by the robot controller 1. The processor 11 of the robot controller 1 functionally includes an abstract state setting unit 31, a dynamics/constraint force setting unit 32, a target logical formula generation unit 33, a skill use setting unit 34, an optimization processing unit 35, and a control command generation unit 36. Although data to be transferred between the blocks are exemplarily shown in FIG. 4, the data to be transferred is not limited thereto. The same applies to the drawings of other functional blocks described below.

The abstract state setting unit 31 sets a state (also referred to as an "abstract state") in which the state of the objects existing in the workspace is abstractly represented on the basis of the environmental object information I1 and the operational object information I3. The abstract state setting unit 31 acquires, from the operational object information I3, information (also referred to as "object-to-object relation information Ir") representing the object-to-object relation in the target (goal) state indicating the state in which the objective task has been completed. The abstract state setting unit 31 may recognize the state of the environmental object and the operational object existing in the workspace on the basis of the measurement signal S2 and update the environmental object information I1 and the operational object information I3 on the basis of the recognition result.

Based on the abstract state set by the abstract state setting unit 31 and the object-to-object relation information Ir, the dynamics/constraint force setting unit 32 defines the constraint (bond) between the objects to be joined or released and sets an abstract model (also referred to as "system model Mb") of system dynamics in the motion planning.

The target logical formula generation unit 33 generates a logical formula (also referred to as "target logical formula") in a temporal logic representing the goal (target) state in the system model Mb. In this case, the target logical formula generation unit 33 generates a logical formula in a temporal logic representing a target logical formula (also referred to as "target relation integrated logical formula φ1") relating to join and release, and, also generates a logical formula in a temporal logic representing the target logical formula (also referred to as "general target logical formula φ2") relating to operations other than join and release. The target relation integrated logical formula φ1 and the general target logical formula φ2 are used as a part of constraint conditions or a part of the evaluation function in the optimization problem set in the optimization processing unit 35.

The skill use setting unit 34 sets an operation command (also referred to as "skill use operation command φ3") to the robot 5 in the temporal logic using the skills and the evaluation function (also referred to as "skill use evaluation function $F_s$") considering the use of the skills, respectively. In this instance, the skill use setting unit 34 extracts skill information "Isn" required for generation of an operation command from the skill database I4 on the basis of the object-to-object relation information Ir. The skill use operation command φ3 is reflected in either the constraint conditions or the evaluation function (objective function) in the optimization problem set in the optimization processing unit 35 while the skill use evaluation function $F_s$ is reflected in the evaluation function in the above optimization problem.

The optimization processing unit 35 constructs the trajectory planning problem of the robot 5 in the form of an optimization problem based on the target relation integrated logical formula φ1, the general target logical formula φ2, the skill use operation command φ3, and the skill use evaluation function $F_s$. Then, the optimization processing unit 35 generates a variable sequence "Z" indicating the target trajectory in the time series by solving the constructed optimization problem.

The control command generation unit 36 generates a control command S1 corresponding to the motion planning of the robot 5 on the basis of the variable sequence Z indicating the target trajectory and the skill information Isn. Then, the control command generation unit 36 supplies the generated control command S1, via the interface 13, to the robot 5.

Here, for example, each component of the abstract state setting unit 31, the dynamics/constraint force setting unit 32, the target logical formula generation unit 33, the skill use setting unit 34, the optimization processing unit 35, and the control command generation unit 36 can be realized by the processor 11 executing a program. Additionally, the necessary programs may be recorded on any non-volatile storage medium and installed as necessary to realize each component. It should be noted that at least some of these components may be implemented by any combination of hardware, firmware, and software, or the like, without being limited to being implemented by software based on a program. At least some of these components may also be implemented by a user programmable integrated circuit such as a FPGA (Field-Programmable Gate Array) and a microcontroller. In this case, the integrated circuit may be used to realize a program functioning as the above components. At least some of the components may also be configured by an ASSP (Application Specific Standard Produce), an ASIC (Application Specific Integrated Circuit), or a quantum computer-controlled chip. Accordingly, each component may be implemented by any kind of hardware. The above is true for other example embodiments described later. Furthermore, each of these components may be implemented by the cooperation of a plurality of computers, for example, using cloud computing technology.

(5) Details of Abstract State Setting Unit

First, the object-to-object relation information Ir that is acquired by the abstract state setting unit 31 will be specifically described.

For example, the object-to-object relation "$E_{ij}$" between the object "$p_i$" and the object "$p_j$" is expressed in the following format:

(5) Details of Abstract State Setting Unit

Here, "$RPA_{ij}$" represents the relative position and posture between the object "$p_i$" and the object "$p_j$". In addition, "way" indicates the method of join and release, and also functions as label information for identifying the skill to be described later. Thus, in this instance, the above-mentioned $E_{ij}$ indicates the following:

"The object $p_j$ is joined to or unjoined from the object $p_i$ using a method "way" at the relative position and posture $RPA_{ij}$."

It is noted that the relative position and posture $RPA_{ij}$ may not be specified in $E_{ij}$ when release is performed.

The relative position and posture $RPA_{ij}$ represents the position and posture of the object $p_j$ that is originally expressed in the coordinate system "$\Sigma_j$" by the coordinate system "$\Sigma_i$" of the object $p_i$, and is expressed by a pair of the relative position vector "$r_{pij}$" and the relative posture vector "$r_{Rij}$" as follows.

$$RPA_{ij}=(r_{pij},r_{Rij})$$

However, the coordinate system $\Sigma_i$ and $\Sigma_j$ are coordinate systems attached to one point of the object $p_i$ and one point of the object $p_j$ and move together with the objects $p_i$ and $p_j$, respectively. The relative posture vector may be expressed in a form using the Euler angle and quaternion, or may be expressed as a vector obtained by vertically connecting the column vectors of the rotation matrix representing the posture.

The method "way" corresponds to the skill identification label included in the skill information registered in the skill database 14, and associates the object-to-object relation information Jr with the corresponding skill information. Therefore, the skill information of the skill which realizes the method "way" includes the same skill identification label as the method "way". Further, the storage device 4 stores, for each of possible methods "way", information on the constraint formula between the paired objects. In this way, the method "way" is associated is with the constraint formula between the paired objects and the abstract state setting unit 31 acquires the object-to-object relation information Ir including information on the above-mentioned constraint formula.

Figure 5:
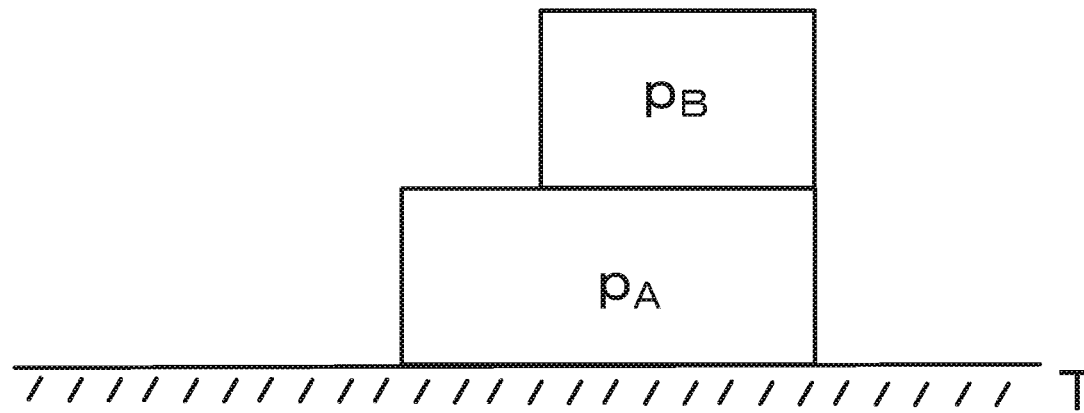
FIG. 5 It shows the state of the table and parts in the target state.

FIG. 5 shows the state of the table "T", the part "$p_A$" and the part "$p_B$" in the target state. Here, as an example, it is assumed that the target state is the state in which the part $p_A$ is mounted on the table T and the part $p_B$ is mounted on the part $p_A$. In this case, the abstract state setting unit 31 defines the object-to-object relation "$E_{TA}$" between the table T and the part $p_A$ and the object-to-object relation "$E_{AB}$" between the part $p_A$ and the part $p_B$ as follows by referring to the operational object information I3 corresponding to each of the part $p_A$ and the part $p_B$ that are operational objects.

$$E_{TA}=(T,p_A,(r_{pTA},r_{RTA}),\text{put\_on})$$

$$E_{AB}=(p_A,p_B,(r_{pAB},r_{RAB}),\text{put\_on})$$

Here, "$(r_{prA}, r_{RTA})$" indicates the position and posture of the coordinate system of the part $p_A$ with respect to the coordinate system of the table T, and "$(r_{pAB}, r_{RAB})$" indicates the position and posture of the coordinate system of the part $p_B$ with respect to the coordinate system of the part $p_A$. The value "put_on" is a value of the method "way" that specifies the joining method "place on".

The abstract state setting unit 31 acquires the object-to-object relation information Ir representing the object-to-object relation as described above from the operational object information I3 and supplies it to the processing blocks such as the dynamics/constraint force setting unit 32, the target logical formula generation unit 33, and the skill use setting unit 34.

Next, the generation of the abstract state vector indicative of the abstract state abstractly representing the state of the objects existing in the workspace in the motion planning will be described. The abstract state setting unit 31 generates an abstract state vector "X" (also simply referred to as "state X") as follows based on the environmental object information I1 and the operational object information I3.

$$X=[X_o{}^T,X_h{}^T,X_e{}^T]$$

Here, "$X_o$" is a vector representing the state (e.g., position, posture, velocity, etc.,) of operational object(s), "$X_h$" is a vector representing the state of the end effector(s) of the operable robot 5, and "$X_e$" is a vector representing the state of the environmental object(s). These state vectors are expressed as follows, where the number of operational objects is "$N_o$", the number of end effectors is "$N_h$", and the number of environmental objects is $N_e$.

$$X_o=[X_{o,1}{}^T, \ldots ,X_{o,No}{}^T]^T$$

$$X_h=[X_{h,1}{}^T, \ldots ,X_{h,Nh}{}^T]^T$$

$$X_e=[X_{e,1}{}^T, \ldots ,X_{e,Ne}{}^T]^T$$

In these state vectors, the elements "$X_{o,1}$" to "$X_{o,No}$", "$X_{h,1}$" to "$X_{h,Nh}$", "$X_{e,1}$" to "$X_{e,Ne}$" corresponding to each object indicate vectors representing the states (e.g., position, posture, velocity, etc.,) of each object. In this way, in the abstract space, the state of the robot 5 is abstractly (simply) represented by the state of the end effector(s). The state of each object corresponding to the operational object or the environmental object is also abstractly represented, for example, in the reference coordinate system.

Here, the operational object and the environmental object may be objects defined based on external input from the user before the motion planning. For example, if a part required for assembling is contained in a lidded box as of formulating the motion planning, the state vector X corresponding to the part contained in the lidded box may be defined on the basis of an external input or the like, and the state vector $X_e$ corresponding to the lidded box may be defined by an external input or the like. The information defined in this manner is previously stored in the storage device 4, for example, as the environmental object information I1 or the operational object information I3.

The abstract state setting unit 31 determines the initial values of the abstract state vector X representing the state of the abstract space before performing the task, for example, on the basis of the state recognition result such as the position and the posture of the respective objects existing in the workspace recognized by analyzing the measurement signal S2. It is noted that, if the environmental object information I1 and the operational object information I3 include information representing the initial state before performing the task such as the position and the posture of each object in advance, the abstract state setting unit 31 may determine the initial values of the abstract state vector X by referring to the environmental object information I1 and the operational object information I3.

(6) Details of Dynamics/Constraint Force Setting Unit

Next, the details of the process that is executed by the dynamics/constraint force setting unit 32 will be described. The dynamics/constraint force setting unit 32 defines the constraints occurring in the abstract space in which the abstract state vector X is defined and sets the dynamics of join and release in the abstract space.

Here, as a premise, the end effector(s) of the robot 5 can grasp any objects (including an operational object and an environmental object). In this case, the dynamics/constraint force setting unit 32 refers to the object-to-object relation information Ir and defines a constraint vector "$\lambda_{hi,\ oj}$" between each end-effector $h_i$ and each target $o_j$, the constraint formula "$Ch_{hi,\ oj}X-G_{hi,}$ of (X)=0", and the constraint switch variable "$\eta_{hi,\ oj}$" (i=1, $N_h$ and j=1, . . . , $N_o$ in each variable), which is a scalar value representing whether or not a constraint exists. It is noted that "$C_{hi,\ oj}$" denotes a constraint formula coefficient matrix with the same number of elements as the number of elements of the constraint force $\lambda_{hi,\ oj}$, and "$G_{hi,\ oj}$" denotes a predetermined function. This constraint formula gives a constraint for the relative motion between the end effector(s) and each operational object. As an example, this constraint formula represents a constraint in which the relative position of the end-effector $h_i$ and the operational object $o_j$ approximates exponentially zero over time.

Assuming that the position and translation speed of the end-effector $h_i$ are denoted by "$p_{x,\ hi}$", "$p_{y,\ hi}$", "$p_{z,\ hi}$", "$p'_{x,\ hi}$", "$p'_{y,\ hi}$", and "$p'_{z,\ hi}$", and the position and translation speed of the operational object $o_j$ are "$p_{x,\ oj}$", "$p_{y,\ oj}$", "$p_{z,\ oj}$", "$p'_{x,\ oj}$", and "$p'_{z,\ oj}$", the constraint is given as follows.

$$p'_{x,hi}-p'_{x,oj}=-(p_{x,hi}-p_{x,oj})$$

$$p'_{y,hi}-p'_{y,oj}=-(p_{y,hi}-p_{y,oj})$$

$$p'_{z,hi}-p'_{z,oj}=-(p_{z,hi}-p_{z,oj})$$

In this instance, the left-hand side of the equations corresponds to "$C_{hi,\ oj}X$" in the aforementioned constraint formula "$C_{hi,\ oj}X-G_{hi,\ oj}(X)=0$", and the right-hand side corresponds to "$G_{hi,\ oj}(X)$".

The dynamics/constraint force setting unit 32 refers to the object-to-object relation information Ir and defines the constraint force vector "$\lambda_{hi,\ ek}$" between each end effector $h_i$ and each environmental object $e_k$, the constraint formula "$C_{hi,\ ek}X-G_{hi,\ ek}(X)=0$", and the constraint switch variable "$\eta_{hi,\ ek}$" (i=1, . . . , $N_h$ and k=1, . . . , $N_e$ in each variable), which is a scalar value representing the presence or absence of the constraint, respectively. "$C_{hi,\ ek}$" indicates a constraint force coefficient matrix. In addition, "$G_{hi,\ ek}(X)$" is a predetermined function.

In addition, the dynamics/constraint force setting unit 32 refers to the object-to-object relation information ir and defines the constraint between the objects between which the relation is indicated in the object-to-object relation information Ir. Here, when the objects between which the relation is indicated in the object-to-object relation information Ir are denoted by "$o_m$" and "$o_n$", the dynamics/constraint force setting unit 32 defines the constraint force "$\lambda_{om,\ on}$" between the paired objects, the constraint formula "$C_{om,\ on}(X)-G_{om,\ on}(X)=0$", and the constraint switch variable "$\eta_{om,\ on}$" representing the presence or absence of the constraint, respectively. "$C_{om,\ on}$" indicates a constraint coefficient matrix. "$G_{om,\ on}(X)$" is a predetermined function.

In addition, the dynamics/constraint force setting unit 32 defines a constraint between a reference object, such as a worktable, defined as a reference coordinate system, and each object (including operational objects and environmental objects). For example, information on these constraints is previously stored in the storage device 4 as the object-to-object relation information Ir or the information equivalent thereto. The dynamics/constraint force setting unit 32 in this case defines the constraint force "$X_{oi,\ w}$" between the reference object and each operational object, the constraint formula "$C_{oi,\ w}X-G_{oi,\ w}(X)=0$", and the constraint switch variable "$\eta_{oi,\ w}$" representing the presence or absence of the constraint (in each variable, i=1, . . . , $N_o$), respectively. The dynamics/constraint force setting unit 32 defines the constraint force "$\lambda_{ck,\ w}$" between the reference object and each environmental object, the constraint formula "$C_{ek,\ w}X-G_{ek,\ w}(X)=0$", and the constraint switch variable "$\eta_{ek,\ w}$" (i=1, . . . , $N_h$ and k=1, . . . , $N_e$ in each variable), respectively. It is noted that "$C_{oi,\ w}$" and "$C_{ek,\ w}$" denote constraint force coefficient matrices, and "$G_{oi,\ w}(X)$" and "$G_{ek,\ w}(X)$" are predetermined functions.

Then, the dynamics/constraint force setting unit 32 defines the constraint force vector "A" into which all constraint switch variables in constraint formulas associated with the abstract space are synthesized, the constraint coefficient matrix "$C_{all}$", the constraint switch matrix "H", and a vector "$G_{all}$" into which all functions in the constraint formula are synthesized. The symbol "A" denotes a vector in which each constraint force vector is connected vertically, the symbol "$C_{all}$" denotes a matrix in which each constraint formula coefficient matrix is connected vertically, and the symbol "$G_{all}$" denotes a vector in which functions in each constraint formula are connected vertically.

$$\wedge=[\lambda^T_{h1,o1},\ .\ .\ .\ ,\lambda^t_{eNe,w}]^T$$

$$C_{all}=[C^T_{h1,o1},\ .\ .\ .\ ,C^T_{eNe,w}]^T$$

$$G_{all}=[G^T_{h1,o1},\ .\ .\ .\ ,G^T_{eNe,w}]^T$$

It is herein assumed that the superscript "T" represents transpose of the matrix. "H" represents the following diagonal matrix having each constraint switch variables as the diagonal elements.

$$H=blk\mathrm{diag}(\eta_{h1,o1},\ .\ .\ .\ ,\eta_{ewe,w}I_{neNe,w})$$

The symbol "blkdiag" denotes a function that generates a block diagonal matrix, and "In" denotes "n"-by-"n" identity matrix. In addition, "$n_{h1,\ oj}$" denotes the number of elements of each constraint force vector "$\lambda_{h1,\ oj}$". Then, the dynamics/constraint force setting unit 32 sets a system model Mb that is a model representing the dynamics of join and release in the abstract space using these defined elements. The system model Mb is represented, for example, by a difference equation representing the dynamics and a constraint equation shown below.

$$X[k+1]=F(X[k],U[k])+C_{all}^TH[k]^T\wedge[k]$$

$$H[k](C_{all}X[k+1]-G_{all}(X[k]))=0$$

Here, the first expression is a difference equation representing the relation between the abstract state at the time step "k" and the abstract state at the time step "k+1". The symbol "U" is denotes the input (e.g., input to the robot 5) in the abstract space, and the symbol "F" denotes a predefined function. The control input may be speed or acceleration. The function F is previously stored in the storage device 4 or the like. These equations consider only the dynamics of the end effector(s) of the robot 5, rather than the detailed dynamics of the entire robot 5. Thus, it is possible to suitably reduce the computational complexity of the optimization process.

(7) Details of Target Logical Formula Generation Unit

First, a method of generating the target relation integrated logical formula φ1 will be described. The target logical formula generation unit 33 generates the target relation integrated logical formula φ1 relating to the join and release between objects based on the object-to-object relation information Ir and the system model Mb set by the dynamics/constraint force setting unit 32.

FIG. 6 is a functional block diagram of the target logical formula generation unit 33 relating to the generation of the target relation integrated logical formula φ1. The target logical formula generation unit 33 functionally includes a target relation logical formula generation unit 331 and a target relation logical formula integration unit 332.

The target relation logical formula generation unit 331 generates a logical formula (also referred to as "target relation logical formula φe") which represents the individual relation of any pair of objects between which the relation is defined by the object-to-object relation information Ir. For example, the target relation logical formula generation unit 331 defines a target relation logical formula φe representing a joint relation between an object "$o_i$" and an object "$o_j$" between which the relation is indicated in the object-to-object relation information Ir as the following equation.

$$\varphi e_{oi,oj} = \Box\Box((\eta_{oi,oj}=1)\wedge(g_{oi,oj}(X,RPA_{oi,ojl})=0))$$

In the above equation, the operator "□" which corresponds to "eventually" in the Linear Temporal Logic (LTL), logical AND "∧", logical OR "∨", and always "□" are used. In addition to these operators, the target logical formula generation unit 33 may express a logical formula using negative "¬", logical implication "⇒", next"○", and until "U". For example, the above formula is previously stored in the storage device 4 or the like.

The above equation indicates that there is a constraint between the object $o_i$, and the object $o_j$, and the relative goal state of the two objects is $RPA_{oi,\ oj}$. The constraint switch variable $\eta_{oi,\ oj}$ is set to 0 when the release is performed. Here, "$g_{oi,\ oj}(X, RPA_{oi,\ oj})=0$" is a constraint formula determined based on the system model Mb and represents a constraint formula that satisfies the relative position and posture $RPA_{oi,\ oj}$ in the state X.

By using the above equation, the target relation logical formula generation unit 331 can suitably generate a target relation logical formula φe representing the individual relation between any two objects.

The target relation logical formula generation unit 331 may represent the logical formula using any kind of temporal logic other than the linear temporal logic such as a MTL (Metric Temporal Logic) and a STL (Signal Temporal Logic).

For example, if a STL is used, a continuous variable may be used instead of a discrete variable of 0 or 1 as the constraint switch variable $\eta_s$. In this case, on-state and off-state of the constraint can then be expressed as follows using a certain parameter "ε".

$$ON:\eta \geq \varepsilon$$

$$OFF:\eta_s < \varepsilon$$

When this representation is used, the target relation logic equation φe which represents the joint relation between the object $o_i$ and the object $o_j$ between which the relation is shown in the object-to-object relation information Ir can be expressed as follows.

$$\varphi e_{oi,oj} = \Box\Box((\eta_{oi,oj} \geq \varepsilon)\wedge(g_{oi,oj}(X,RPA_{oi,oj})=0))$$

The target relation logical formula integration unit 332 generates the target relation integrated logical formula φ1 in which the target relation logical formulas φe generated by the target relation logical formula generation unit 331 are integrated. In this case, the target relation logical formula generation unit 331 generates the target relation integrated logical formula φ1 in which all the target relation logical formulas φe individually generated between any two objects are combined by logical AND.

Figures 6A, 6B:
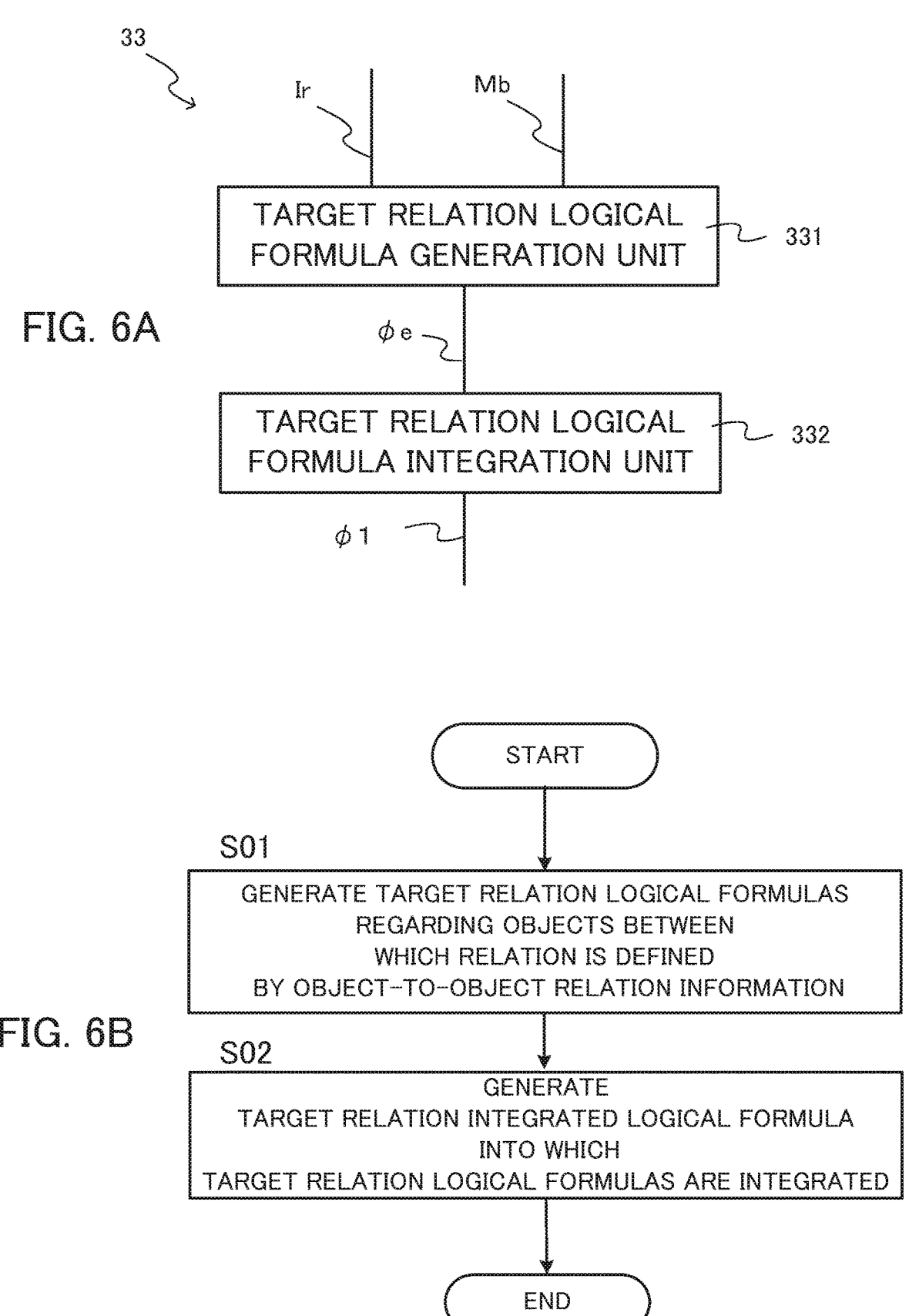
FIG. 6 It shows a functional block diagram of a target logical formula generation unit relating to the generation of the target relation integrated logical formula.

FIG. 6B is an example of a flowchart illustrating a process of generating the target relation integrated logical formulas φ1 by the target logical formula generation unit 33.

The target relation logical formula generation unit 331 generates the target relation logical formulas φe which represent the individual relations between any two objects between which the relation is defined by the object-to-object relation informational Ir (step S01). Then, the target relation logical formula integration unit 332 generates the target relation integrated logical formula φ1 into which the target relation logical formulas φe generated by the target relation logical formula generation unit 331 are integrated (step S02).

Next, a description will be given of a method of generating the general target logical formula φ2. The target logical formula generation unit 33 generates a general target logical formula φ2 including constraint conditions other than constraint conditions on join and release, based on the general constraint condition information I2. The general constraint condition information I2 may include not only information on general constraint conditions to be generally satisfied in the objective task but also information on any other constraint conditions that are specified by the user.

One of the constraint conditions based on the general constraint condition information I2 is a constraint condition for avoiding obstacles. Here, it is assumed that "Ao(X)≥0" indicates such a constraint condition that object(s) and end effector(s) considered as the abstract space do not enter the area of obstacle(s) existing in the workspace. In this case, the target logical formula generation unit 33 sets the general target logical formula φ2 as follows.

$$\varphi 2 = \Box(Ao(X) \geq 0)\ or$$

$$\varphi 2 = \Box \overline{\phantom{aa}}(Ao(X) < 0)$$

(8) Details of Skill Use Setting Unit

(8-1) Data Structure of Skill Information

First, a description will be given of the data structure of the skill information included in the skill database 14 to be referred to by the skill use setting unit 34.

The skill information includes a skill identification label, skill execution information, and skill control command information, and has the following eight elements in detail.
  (way, $\mathcal{X}_s^-$, $\mathcal{X}_s^+$, $t_s$, $J_s$, $\Psi_s$, $f_s$, $\Gamma_s$)
Here, each symbol representing each element of the skill information is defined as follows.
  way: skill identification label
  $\mathcal{X}_s^-$: set of states where skill is executable
  $\mathcal{X}_s^+$: set of states after execution of skill
  $t_s$: time required for performing skill
  $J_s$: cost to perform skill
  $\Psi_s$: operation command to perform skill in abstract space
  $f_s$: trajectory generation function
  $\Gamma_s$: controller for implementing trajectory set based on trajectory generation function
  The set $\mathcal{X}_s^-$ of states where the skill is executable, the set $\mathcal{X}_s^+$ of states after execution of the skill, the time $t_s$ required for performing skill, the cost $J_s$, the operation command $\Psi_s$ correspond to skill execution information, whereas the trajectory generation function $f_s$ and the controller $\Gamma_s$ correspond to skill control command information. Here, the set $\mathcal{X}_s^-$ of states where the skill is executable or the set $\Omega_x^+$ of states after execution of the skill may be a set not only include the state "x" in the actual dynamics of objects existing in the workspace but also the constraint force $\lambda$ in the actual dynamics of the objects existing in the workspace and/or the input u for the robot 5. In other words, the set $\mathcal{X}_s^-$ of states where the skill is executable and the set $\mathcal{X}_s^+$ of states after execution of the skill are equivalent to information indicative of executable conditions of the skill and post-conditions when the skill is executed.

The operation command $\Psi_s$ is a temporal logic formula which describes operation(s) for the transition from the set $\mathcal{X}_s^-$ of states where the skill is executable to the set $\mathcal{X}_s^+$ of states after execution of the skill and the operation command $\Psi_s$ may be represented by any form of temporal logic proposition. For example, the operation command $\Psi_s$ may be represented by a Grid TLI (Grid-Based Temporal Logic Interface) that is a temporal logic proposition that divides the state space and time into grids and uses those grids to specify a rough motion (such as a trajectory) of the system.

The trajectory generation function $f_s$ and the controller $\Gamma_s$ correspond to the skill control command information and are learned in advance by any skill learning. The trajectory generating function $f_s$ and the controller $\Gamma_s$ are represented as follows, respectively.

$$x(t)=f_s(t,x_0),t\in[0,t_s]$$

$$u=\Gamma_s(t,x)$$

Here, "$x_0$" represents the initial state of the state x, and "u" represents the actual input to the system (mainly robot 5). It is noted that the trajectory generation function $f_s$ and the controller $\Gamma_s$ may be parameterized by parameters $\alpha_1$ and $\alpha_2$ as $f_s(t, x_0, \alpha_1)$ and $\Gamma_s(t, x, \alpha_2)$.

As the learning of the trajectory generation function and the controller, for example, a technique such as a motion learning primitive (DMP: Dynamic Movement Primitive) may be used. the use of DMP can make it possible to learn: the trajectory generation function configured to reproduce the motion from the time series motion trajectory data of the robots that is given; and the controller for implementing the trajectory based on and the trajectory generation function.

Here, a supplementary description will be given of the cost $J_s$. When performing a skill, the motion represented in abstract space and the motion realized in an actual robot are different. For example, the motion of screwing objects is modeled in abstract space by simply reducing the relative distance between the objects to be screwed and switching the constraint switch variable to ON. However, when an attempt is made to do this with an actual robot, complicated operations, such as turning a screw with a screwdriver after adjusting the positions of the objects, are required. Considering the above, in the present example embodiment, a cost $J_a$ representing how much input is required to execute the skill in the actual robot is defined. Thus, it becomes possible to suitably consider the energy or the like required when moving the actual robot even if the motion planning in the abstract space is performed.

(8-2) Outline of Process Using Skill Information

Figure 7:
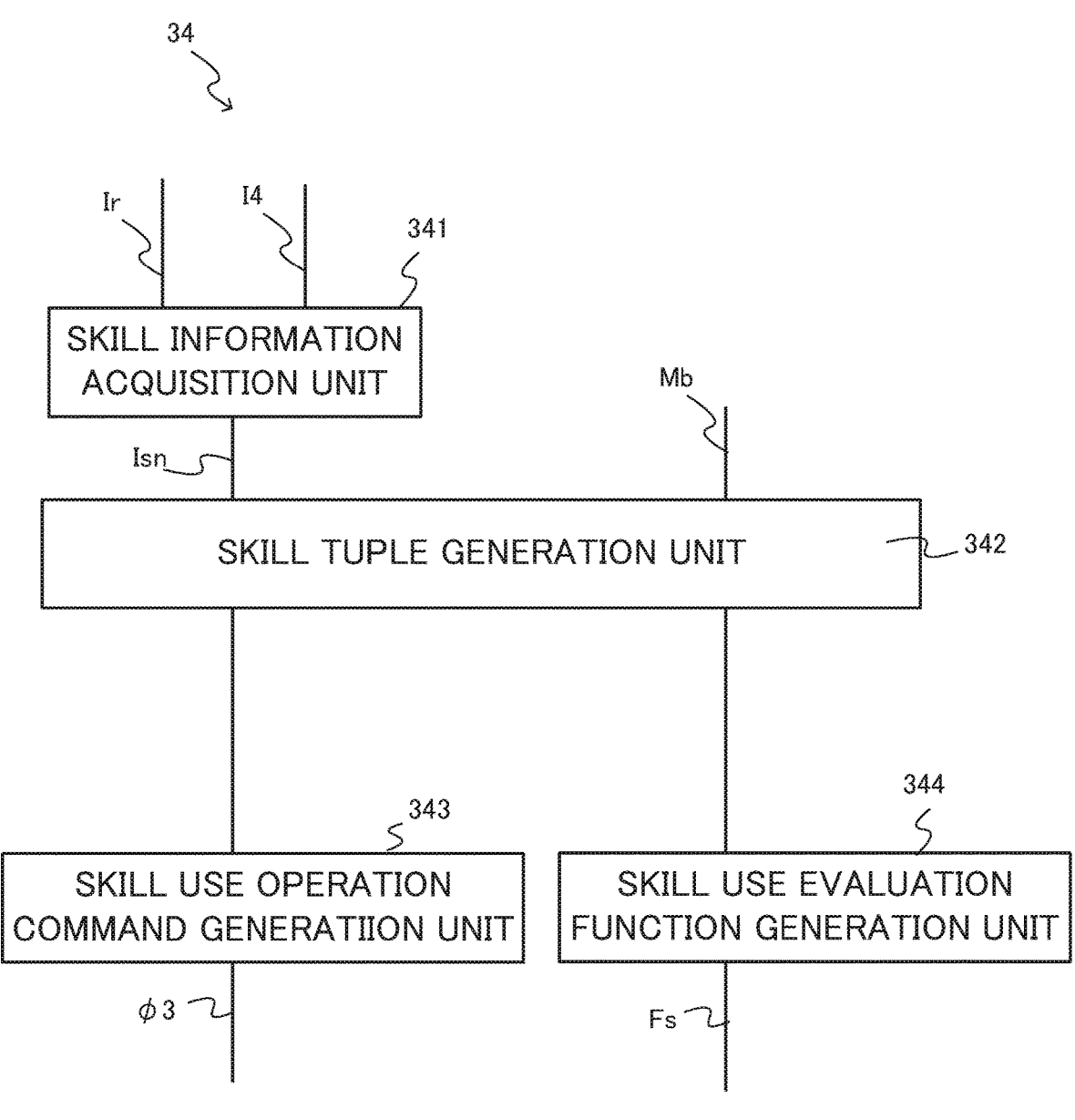
FIG. 7 It shows a functional block diagram of the skill use setting unit.
Figure 8:
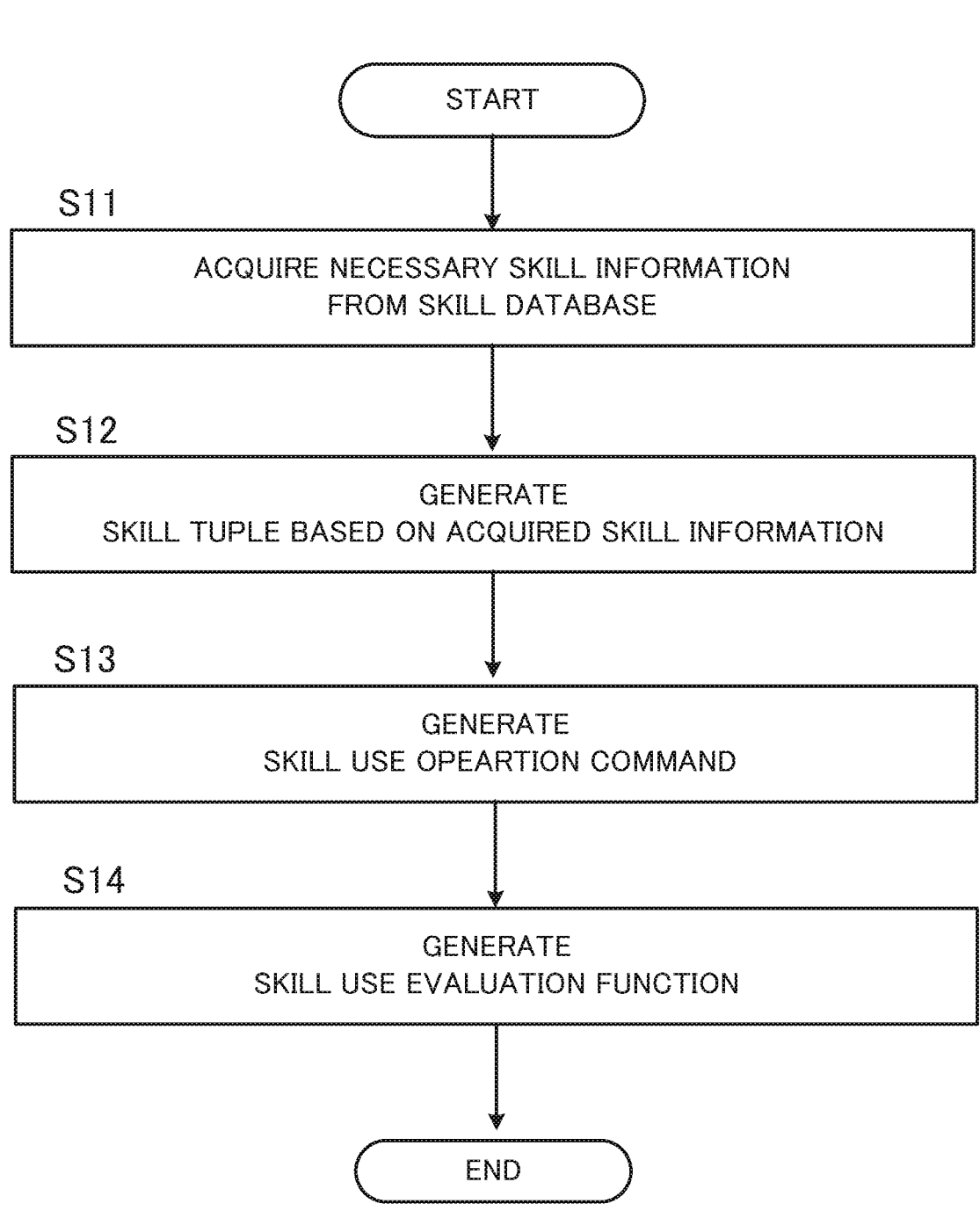
FIG. 8 It shows an example of a flowchart executed by the skill use setting unit.

Next, a description will be given of the details of the process to be executed by the skill use setting unit 34 using the skill information. FIG. 7 shows a functional block diagram of the skill use setting unit 34. As shown in FIG. 7, the skill use setting unit 34 functionally includes a skill information acquisition unit 341, a skill tuple generation unit 342, a skill use operation command generation unit 343, and a skill use evaluation function generation unit 344. Further, FIG. 8 is an example of a flowchart executed by the skill use setting unit 34. Here, the skill information acquisition unit 341 performs the process at step S11, the skill tuple generation unit 342 performs the process at step S12, the skill use operation command generation unit 343 performs the process at step S13, and the skill use evaluation function generation unit 344 performs the process at step S14.

First, the skill information acquisition unit 341 refers to the information on constraints defined in the object-to-object relation information Ir and acquires the required skill information Isn from the skill database 14 (step S11). Specifically, the skill information acquisition unit 341 extracts the skill information Isn which includes the same skill identification label as "way" included in the object-to-object relation information Ir from the skill database 14.

Next, the skill tuple generation unit 342 generates a skill tuple based on the skill information Isn acquired by the skill information acquisition unit 341 and the system model Mb (step S12). Here, the skill tuple is a set of the skill information Isn and related variables of the system model Mb, and specifically represents a set of skill input "$u_s$" representing ON (valid) or OFF (invalid) of the corresponding skill and the constraint switch variable "$\eta_s$" representing ON or OFF of the constraint. Accordingly, the skill tuple generation unit 342 generates a skill tuple representing a set of the skill input $u_s$ and the constraint switch variable $\eta_s$ with respect to each skill information Isn. The skill tuple may include the constraint force "$\lambda_s$" in addition to the skill input $u_s$ and the constraint switch variable $\eta_s$. As such, the skill tuple generation unit 342 redefines the skills information Isn to be adapted to the system model Mb.

Next, the skill use operation command generation unit 343 generates a skill use operation command $\varphi3$ representing the join and release operation corresponding to each skill tuple generated at step S12 by the temporal logic (step S13). Further, the skill use evaluation function generation unit 344 generates the skill use evaluation function $F_s$ considering the join and release operation corresponding to the skill tuple generated at step S12 (step S14). The process at step S13 and the process at step S14 have no particular order and may be performed at the same time, or the process at step S14 may be performed first.

(8-3) Details of Skill Use Operation Command

Next, a description will be given of the skill use operation command $\varphi3$ to be generated at step S13.

For example, regarding the joining operation in the abstract space by skill execution, the skill use operation command generation unit 343 generates the skill use operation command $\varphi3$ that is a temporal logic command to implement the following operations (A) to (C).

(A) change the skill input from OFF to ON in the skill executable set $\mathcal{X}_s^-$ (B) shift the state in abstract space into the state set $\mathcal{X}_s^+$ after execution of the skill according to the operation command $\Psi_s$ and required time length $t_s$ defined for the skill.

(C) if the state is shifted into the state set $\mathcal{X}_s^+$ after execution of the skill, change the constraint switch variable $\eta_s$ corresponding to the executed skill from OFF to ON while changing the skill input $u_s$ from ON to OFF at the time step following a time step at which the skill input is changed to ON.

Further, regarding release of the join in the abstract space by execution of the skill, the skill use operation command generation unit 343 generates the skill use operation command $\varphi 3$ that is a temporal logic command to implement the following operations (D)-(F), for example.

(D) change the skill input $u_s$ from OFF to ON in the skill executable set $\mathcal{X}_s^-$ (E) shift the state into the state set $x_s^+$ after execution of the skill according to the operation command $\omega_s$ and required time length $t_s$ defined for the skill (E) if the state is shifted into the state set $\mathcal{X}_s^+$ after execution of the skill, change the constraint switch variable $\eta_s$ corresponding to the executed skill from ON to OFF while changing the skill input $u_s$ from ON to OFF at the time step following a time step at which the skill input is changed to ON.

Here, a first logical proposition example and a second logical proposition example, which are concrete examples of logical propositions of the skill use operation command $\varphi 3$, will be described in order. Hereafter, as a typical example, the joining operations (A) to (C) when using an LTL will be described respectively.

First, the first logical proposition example will be described. In the first logical proposition example, the operation command "$\varphi_{31}$" corresponding to the operation (A) is expressed by the following equation (1) using a skill input "$u_{s,\ on}$" representing ON by "1" and OFF by "0".

Formula 1

$$\varphi_{31}:(u_{s,on}[k-1]=0)\wedge(u_{s,on}[k]=1)\rightarrow x[k]\in\mathcal{X}_s^- \tag{1}$$

Further, the operation command "$\varphi_{32}$" relating to the operation (B) is represented by the following equation (2).

[Formula 2]

$$\varphi_{32}:(u_{s,on}[k-1]=0)\wedge(u_{s,on}[k]=1)\rightarrow x[k]=\varphi_s \tag{2}$$

In the equation (2), the operation command $\varphi_s$ is a temporal logic formula which describes operation(s) for transition from the skill's executable state set $\mathcal{X}_s^-$ to the state set $\mathcal{X}_x^+$ after execution of the skill. For example, the operation command $\varphi_s$ is a logical formula specifying motion(s) from step "k" to step "k+$n_s$" by Grid TLI or the like. The symbol "$n_s$" represents the number of steps equivalent to the discretized required time length is defined for the skill.

Further, the operation command "$\varphi_{33}$" relating to operation (C) is represented by the following equation (3).

[Formula 3]

$$\varphi_{33}:(u_{s,on}[k-1]=0)\wedge(u_{s,on}[k]=1)\rightarrow(\eta_s[k+n_s]=1)'(u_{s,on}[k+1]=0) \tag{3}$$

In the equation (3), the temporal relation between the skill input $u_{s,\ on}$ and the constraint switch variable $\eta_s$ is expressed as a logical proposition. An example of giving the operation command $\varphi_{33}$ as an equality constraint will be described later as a second logical proposition example.

Then, in the first logical proposition example, the skill use operation command generation unit 343 sets the skill use operation command $\varphi 3$ into which the operation commands $\varphi_{31}$ to $\varphi_{33}$ corresponding to the operations (A) to (C) are integrated by logical AND. In this case, the skill use operation command $\varphi 3$ is expressed as follows.

$$\varphi 3=\varphi_{31}\wedge\varphi_{32}\wedge\varphi_{33}$$

It is noted that release operations (D) to (F) can also be expressed by logical formula equivalent to the equations (1) to (3).

Next, a second logical proposition example will be described. In the second logical proposition example, with respect to the operation (C) included in the join operation and release operation, the temporal relation between the skill input $u_s$ and the constraint switch variable $\eta_s$ is expressed by using an equality constraint. For example, the skill use operation command generation unit 343 sets the equality constraint shown in the following equation (4).

[Formula 4]

$$\eta_s[k]=\eta_s[k-1]+u_{s,on}[k-n_s]-u_{s,off}[k-n_s] \tag{4}$$

Here, the skill input "$u_{s,\ off}$" becomes "0" in the case of OFF and "1" in the case of ON. The equation (4) represents the discrete-time dynamics that represents how the constraint switch variable varies depending on the value of the skill input.

By using the equality constraint shown in the equation (4), the logical formula (the equation (3) in the first logical proposition example) of the operation (C) can be replaced by the equality constraint. Therefore, the skill use operation command generation unit 343 generates the skill use operation command $\varphi 3$ that is a temporal logic command obtained by integrating the equation (1) corresponding to the operation (A) and the equation (2) corresponding to the operation (B). In this case, the skill use operation command $\varphi 3$ is set as follows.

$$\varphi 3=\varphi_{31}\wedge\varphi_{32}$$

Then, in this case, the equality constraint corresponding to the equation (4) is considered as a constraint condition in the optimization problem to be solved by the optimization processing unit 35.

(8-4) Details of Skill Use Evaluation Function

Next, a specific description will be given of the generation of the skill use evaluation function $F_s$ by the skill use evaluation function generation unit 344. The skill use evaluation function generation unit 344 sets the skill use evaluation function $F_s$ in which the cost $J_s$ included in the skill information Isn corresponding to the generated skill tuple is reflected. Here, the skill use evaluation function $F_s$ is, for example, a function in which the cost $J_s$ corresponding to the generated skill pull and the skill input us are used as arguments. The specific form of the skill use evaluation function $F_s$ is set in advance according to the objective task.

Using the skill use evaluation function $F_s$, the evaluation function "J" to be used in the motion planning is represented by, for example, the following equation (5).

Formula 5

$$J=E_{k=0}^N\{L(X[k],U[k])+F_s(J_S[k],u_s[k])\} \tag{5}$$

Here, "k" represents a time step (time), and "N" represents the number of time steps corresponding to the required time length of the entire objective task. Further, "L(X[k],U[k])" takes the state X and the input U in the abstract space as arguments, and is an evaluation function for evaluating operations other than the join and release operations. The evaluation function L may be an evaluation function used in any motion planning. For example, the evaluation function L is an evaluation function that minimizes the control input of the robot 5 (i.e., minimizes the energy spent by the robot 5) or/and the length of the execution time.

The robot controller 1 can reduce the number of executions of the skills and perform an efficient motion planning by using the evaluation function J including such skill use evaluation function $F_s$. Since the evaluation function J includes an evaluation function L that evaluates operations other than the joining and release operations in addition to the skill use evaluation function $F_s$, the robot controller 1 can optimize the entire objective task taking into account the minimization of the inputs in the abstract space.

(9) Details of Optimization Processing Unit

The optimization processing unit 35 constructs an optimization problem that is a trajectory planning problem to minimize the evaluation function J using the system model Mb, the target relation integrated logical formula φ1, the general target logical formula φ2, the skill use evaluation function $F_s$, and the skill use operation command φ3. Then, the optimization processing unit 35 calculates a variable sequence Z representing the optimum target trajectory by solving the configured optimization problem. In this case, the optimization processing unit 35 constitutes an optimization problem shown in the following equation (6).

[Formula 6]

$$\min_{Z} J(Z) \text{ s.t. } G(Z) \le 0 \qquad (6)$$

In the equation (6), the variable sequence Z represents a vector that includes all the variables required for optimization, such as abstract space state sequence X[k], skill input sequence $U_s[k]$, and constraint switch variable sequence η[k]. Here, "G(Z)" represents a vector in which the target relation integrated logical formula φ1, the general target logical formula φ2, the skill use operation command φ3, and the system model Mb are summarized as constraint conditions.

Here, when the linear logical formula or STL is used to represent the temporal logic formula such as the target relation integrated logical formula φ1, the general target logical formula φ2, and the skill use operation command φ3, the optimization processor 35 can convert these temporal logic formulas into constraint conditions and use them. Specifically, in this case, the optimization processing unit 35 converts these temporal logic formulas into equality/inequality constraints using an arbitrary algorithm to convert to equality/inequality constraints and uses the converted equality/inequality constraints as elements of G (Z).

On the other hand, when a MTL or STL is used to represent the temporal logic formulas such as the target relation integrated logical formula φ1, the general target logical formula φ2, and the skill use operation command φ3, the optimization processing unit 35 can also incorporate these temporal logic formulas into the evaluation function J(Z). The type of temporal logic to be used (and whether the temporal logic formulas are set as elements of G (Z) or incorporated into evaluation function J(Z)) is determined, for example, according to the determined objective task.

Then, the optimization processing unit 35 calculates the variable sequence Z in the target trajectory by solving the optimization problem shown in the equation (6).

(10) Details of Control Command Generation Unit

The control command generation unit 36 extracts the state sequence X[k] and the skill input sequence $U_s[k]$ from the variable sequence Z calculated by the optimization processing unit 35, wherein the state sequence X[k] represents the trajectory of the state in the abstract space and the skill input sequence $U_s[k]$ represents time-series skill inputs. Then, based on the state is sequence X[k], the skill input sequence $U_s[k]$ and the skill information Isn, the control command generation unit 36 generates a control command S1 corresponding to a controller scheduled in an actual robot system.

Figure 9:
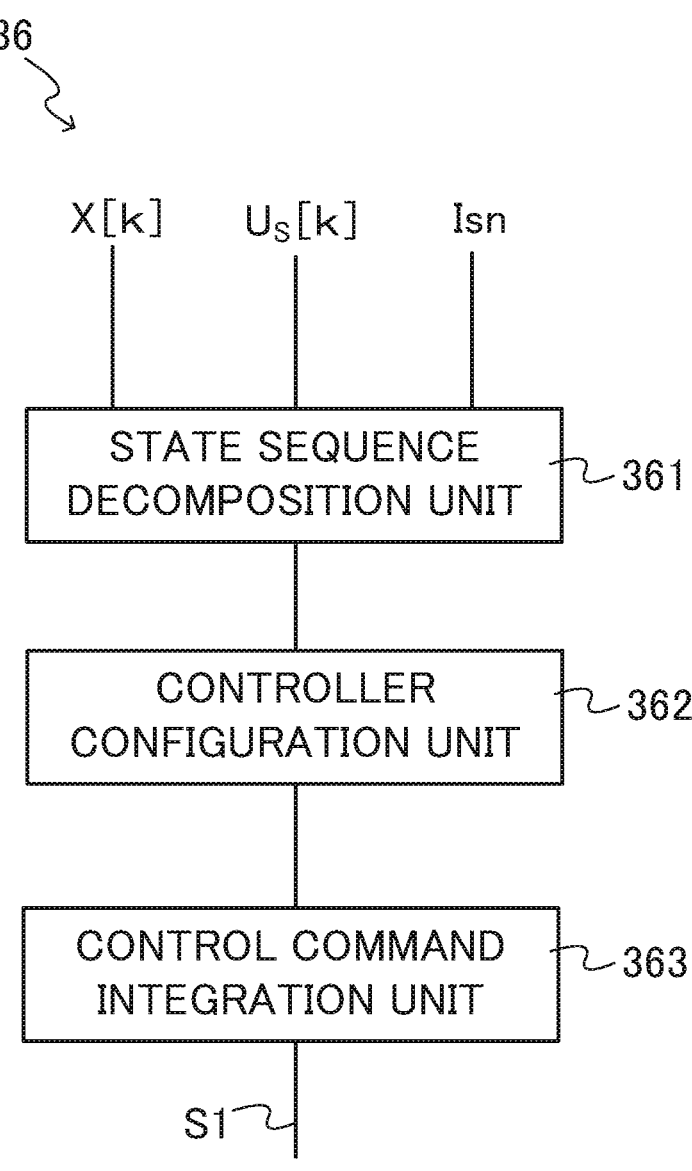
FIG. 9 It shows an example of a functional block diagram showing a functional configuration of the control command generation unit.
Figure 10:
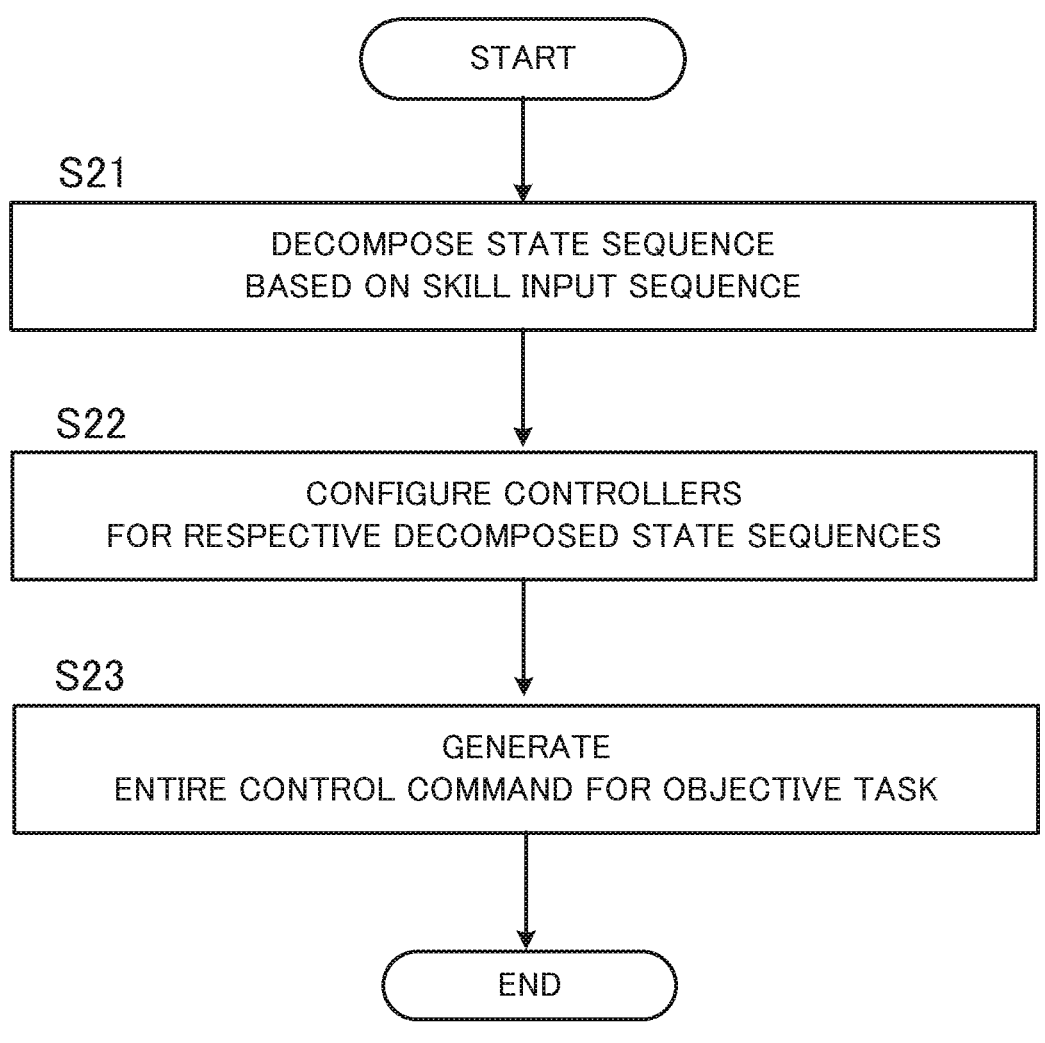
FIG. 10 It shows an example of a flowchart to be executed by the control command generation unit.

FIG. 9 is an example of a functional block diagram showing a functional configuration of the control command generation unit 36. As shown in FIG. 9, the control command generation unit 36 functionally includes a state sequence decomposition unit 361, a controller configuration unit 362, and a control command integration unit 363. Further, FIG. 10 is an example of a flowchart to be executed by the control command generation unit 36. Here, the state sequence decomposition unit 361 performs the process at step S21, the controller configuration unit 362 performs the process at step S22, and the control command integration unit 363 performs the process at step S23.

First, the state sequence decomposition unit 361 decomposes the state sequence X[k] based on the skill input sequence $U_s$ [k] (step S21). In this case, the state sequence decomposition unit 361 determines the skill used at each time (time step) from the skill input sequence $U_s[k]$, and decomposes the state sequence X[k] into skill-specific state sequences (also called "state sub-sequence") for respective skills to be executed.

Next, the controller configuration unit 362 constitutes controllers for respective state sub-sequences obtained by decomposing the state sequence X[k] with respect to each corresponding skill (step S22). In this instance, the controller configuration unit 362 uses the controller $\Gamma_s$ included in the skill information Isn to configure the controller for each of the state sub-sequences. Then, the control command integration unit 363 integrates the controllers configured at step S22 to generate an entire control command S1 scheduled for the objective task (step S23).

First, a specific example of the process to be executed by the state sequence decomposition unit 361 will be described. Here, as an example, a method of utilizing an index sequence based on ON and OFF of the skill input sequence $U_s[k]$ will be described.

FIG. 11 shows time series relations among the time step "k", the skills input sequence "$U_{s1}[k]$" of the first skill, the skills input sequence "$U_{s2}[k]$" of the second skill, and the index "Idx" used for identifying the state sub-sequences when the skills to be executed are two (the first skill and the second skill). It is herein assumed that number $n_s$ of the time steps required for each skill is three.

In this case, first, the state sequence decomposition unit 361 generates the index sequence Idx[k] using the information on the skill input sequences $U_{s1}$ [k] and $U_{s2}$ [k] and the required time step number $n_s$ of the skills. The index sequence Idx[k] is an index sequence that indicates which skill is used at the k (0 to 9) step. Here, the state sequence decomposition unit 361 sets, to "1", the index sequence Idx[k] at the time steps (k=1 to 3) at which the skill input sequence $U_{s1}$ [k] indicates ON and at which the first skill is being executed thereafter, and sets, to "2", the index sequence Idx[k] at the time steps (k=7 to 9) at which the skill input sequence $U_{s2}$ [k] indicates ON and at which the second skill is being executed thereafter. The state sequence decomposition unit 361 sets the index sequence Idx[k] at the time step not related to the skill execution to "0".

Then, the state sequence decomposition unit 361 decomposes the state sequence X[k] with reference to the obtained index sequence Idx[k]. Specifically, the state sequence decomposition unit 361 specifies each group in the state sequence X[k] based on a variation in the index sequence Idx[k]. In this case, the state sequence decomposition unit 361 sequentially specifies groups in sequence by regarding, as a group, a period from the start time of the objective task or the end time of the group specified immediately before to the time when the index subsequently changes. Then, the state sequence decomposition unit 361 uses each specified group as a state sub-sequence. The state sequence decomposition unit 361 adds the information on the index variation to each state sub-sequence.

For example, in FIG. 9, four state sub-sequences (first sub-sequence to fourth sub-sequence) are generated based on the variation in the index sequence Idx[k].

First sub-sequence (Idx=0→1): {X[0], X[1]}
Second sub-sequence (Idx=1→0): {X[1], X[2], X[3], X[4]}
Third sub-sequence (Idx=0→2): {X[4], X[5], X[6], X[7]}
Fourth sub-sequence (Idx=2): {X[7], X[8], X[9]}

In this way, the state sequence decomposition unit 361 can decompose the state sequence X[k] depending on the skill execution timing according to the skill input sequence $U_s[k]$.

Next, a description will be given of the details of the process to be executed by the controller configuration unit 362. The controller configuration unit 362 constitutes controllers for respective state sub-sequences generated by the state sequence decomposition unit 361.

For such a state sub-sequence (i.e., corresponding to the state in which the skill is not used) that the index Idx is about to change from 0, the controller configuration unit 362 generates a smooth target trajectory for the actual system on the basis of the information on the state sub-sequence. The generation of the target trajectory and the configuration of the controller in this case may be based on any method used in a robot control. In the specific example shown in FIG. 11, the controller configuration unit 362 performs the generation of the target trajectory and the configuration of the controller as described above for the first sub-sequence and the third sub-sequence.

On the other hand, for such a state sub-sequence (i.e., corresponding to the state in execution of the skill) that the index Idx is about to change from a value other than 0, the controller configuration unit 362 uses the controller $\Gamma_s$ extracted from the corresponding skill information (see the section "(8-1) Data Structure of Skill Information"). Then, the controller configuration unit 362 sets the parameters of the initial value and the end value to be set for the controller $\Gamma_s$ using the initial state and the end state of the state sub-sequence of interest. In the specific example shown in FIG. 11, the controller configuration unit 362 performs the configuration of the controller using the skill information for the second sub-sequence and the fourth sub-sequence.

Accordingly, the controller configuration unit 362 can suitably configure a controller for any state sub-sequence.

Next, a description will be given of the details of the process to be executed by the control command integration unit 363. The control command integration unit 363 generates entirely-scheduled control command S1 from the controllers generated by the controller configuration unit 362 for each state sub-sequence. In the example shown in FIG. 9, the control command integration unit 363 generates a control command S1 including the following first control step to the fourth control step corresponding to the first sub-sequence to the fourth sub-sequence, respectively.

The first control step is a control step of utilizing a tracking controller for the generated target trajectory (i.e., the trajectory from X[0] to X[1]). In this case, the first control step sets the target state X[1] and sets the transition condition to the second control step (i.e., the end condition of the first control step) which requires to reach the target state. When it is determined that the transition condition to the second control step is satisfied on the basis of the state recognition result by the measurement signal S2 or the like, the transition is made from the first control step to the second control step.

The second control step is a control step of utilizing the controller included in the skill information corresponding to the first skill. The second control step sets the target state X[4], and sets the transition condition to the third control step (i.e., the end condition of the second control step) which requires to reach the target state. Then, if the transition condition to the third control step is satisfied, the transition is made from the second control step to the third control step.

The third control step is a control step of utilizing a tracking controller for the generated target trajectory (i.e., the trajectory from X[4] to X[7]). In this case, the third control step sets the target state X[7], and sets the transition condition to the fourth control step (i.e., the end condition of the third control step) which requires to reach the target state. Then, if the transition condition to the fourth control step is satisfied, the transition is made from the third control step to the fourth control step.

The fourth control step is a control step of utilizing the controller included in the skill information corresponding to the second skill. The fourth control step sets the target state X[9], and sets the end condition of the fourth control step which requires to reach the target state. When it is determined based on the measurement S2 or the like that the transition to the second control step is satisfied, the fourth control step ends.

Thus, the control command generation unit 36 can suitably generate a control command S1 based on: the state sequence X[k] representing the state trajectory in the abstract space extracted from the variable sequence Z by the optimization processing unit 35; the skill input sequence $U_s[k]$ representing the time-series skill inputs; and the skill information Isn.

(11) Overall Processing Flow

Figure 12:
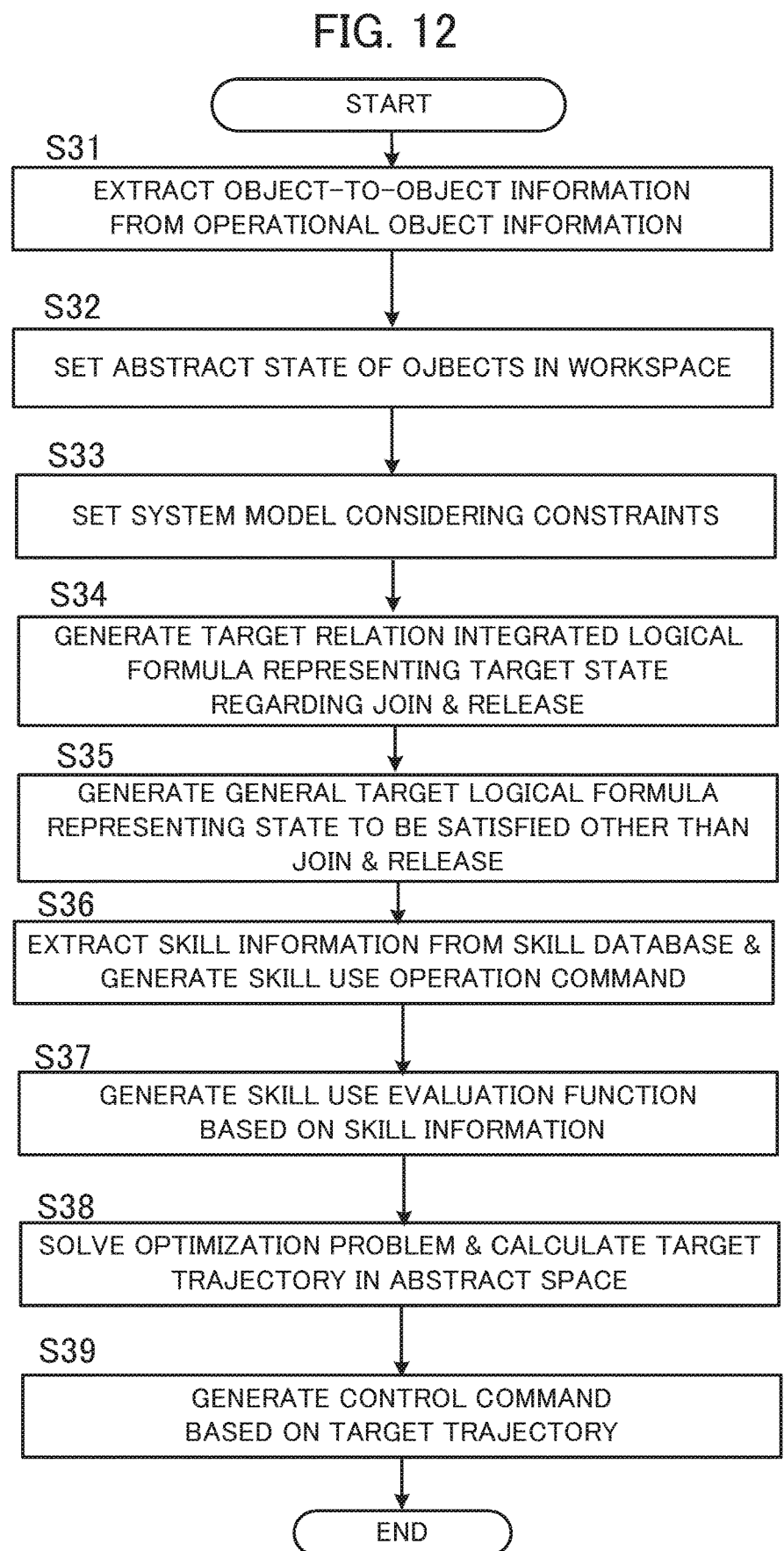
FIG. 12 It shows an example of a flowchart showing a processing procedure related to the motion planning.

FIG. 12 is an example of a flowchart illustrating a processing procedure relating to a motion planning of the robot 5 that is executed by the robot controller 1.

First, the abstract state setting unit 31 of the robot controller 1 extracts the object-to-object relation information Ir from the operational object information I3 stored in the storage device 4 (step S31). Then, the abstract state setting unit 31 sets the abstract state of each of objects existing in the workspace including end effector(s) of the robot 5, operational object(s), and the environmental object(s) (step S32).

Then, the dynamics/constraint force setting unit 32 sets the system model Mb that is the abstract system dynamics considering the constraints between objects on the basis of the object-to-object relation information Ir extracted at step S31 (step S33). Then, the target logical formula generation unit 33 generates the target relation integrated logical formula φ1 representing the goal state relating to join and release by executing the flowchart shown in FIG. 6B on the basis of the object-to-object relation information Ir (step S34). The target logical formula generation unit 33 generates a general target logical formula φ2 representing the states (for example, constraint conditions relating to obstacle avoidance) that should be satisfied other than the states regarding join and release operations, based on the general constraint condition information I2 (step S35).

Next, the skill use setting unit 34 extracts the skill information Isn from the skill database I4 and generates a skill use operation command φ3 (step S36). Further, the skill use setting unit 34 generates a skill usage evaluation function $F_s$ based on the skill information Isn (step S37). Specifically, the skill use setting unit 34 generates the skill use operation command φ3 and the skill use evaluation function $F_s$ at step S36 and step S37 by executing the flowchart shown in FIG. 8.

Next, the optimization processing unit 35 constructs an optimization problem based on the processing results at step S33 to step S37, and calculates a target trajectory in the abstract space by solving the optimization problem (step S38). In this case, the optimization processing unit 35 constitutes an optimization problem shown in the equation (6). Then, the optimization processing unit 35 extracts the state sequence X[k] and the skill input sequence $U_s$[k] from the variable sequence Z indicating the calculated target trajectory.

Next, based on the target trajectory calculated at step S38, the control command generation unit 36 generates a control command S1 (step S39). In this instance, for example, in accordance with the flowchart shown in FIG. 10, the control command generation unit 36 generates a control command S1 in the actual robot system, based on the state sequence X[k], the skill input sequence $U_s$[k] representing the time-series skill inputs, and the skill information Isn.

(12) Technical Effect

A supplementary description will be given of the technical effects based on the robot control system 100 in the first example embodiment.

When a robot is introduced to a complicated task associated with joining multiple objects (including contact) such as assembly of parts, the system integration of a process design to disassemble a task and design a work process and a motion design to generate an actual motion plan from the process design is a bottleneck. For example, it is difficult to obtain a model considering the elasticity of objects and the fitting of objects which are necessary in carrying out the motion plan of the robot associated with jointing objects. Also, even if a model of objects is obtained that takes into account joining objects, such models are often difficult to use for motion planning because they have complex properties (nonlinearity and hybridity). When a given task is configured by multiple subtasks and its execution order is not explicitly given, both the motion planning for executing each subtask and the subtask order must be calculated. Especially, when the motion planning of the robot is performed by using the complicated model considering the joining objects and the like as mentioned above, there is a possibility that the motion planning cannot be performed during a practical time period. Thus, how the structure of a model and algorithm to be used for motion planning can be simplified becomes an important issue in practical application.

Taking the above into consideration, the robot controller 1 according to the first example embodiment executes a motion planning method with low computational cost in consideration of joining objects and the like. In this case, the robot controller 1 uses the temporal logic and skills in the abstract space, and abstractly express joining objects, and formulates a plan in which the calculation cost is suppressed even in the multi-stage task including joining operations. Then, the robot controller 1 appropriately calculates the control command S1 in the actual system using the motion planning result and the skill information in the abstract space.

For example, in pick-and-place of an object, exact calculation is generally necessary in the motion planning considering the grip position and posture of the manipulator and the object property of the object to be grasped based on the end-effector shape of the manipulator and the geometry of the object part to be grasped. In contrast, according to the first example embodiment, it is assumed that grasping target object to be grasped can be realized by "execution of skill in graspable area" in the abstract space, and the motion planning is performed using this expression. Thus, in the first example embodiment, by expressing the skills obtained by modularizing the operations relating to the joining objects and the like in the abstract space, the motion planning problem can be simplified.

Second Example Embodiment

Figure 13:
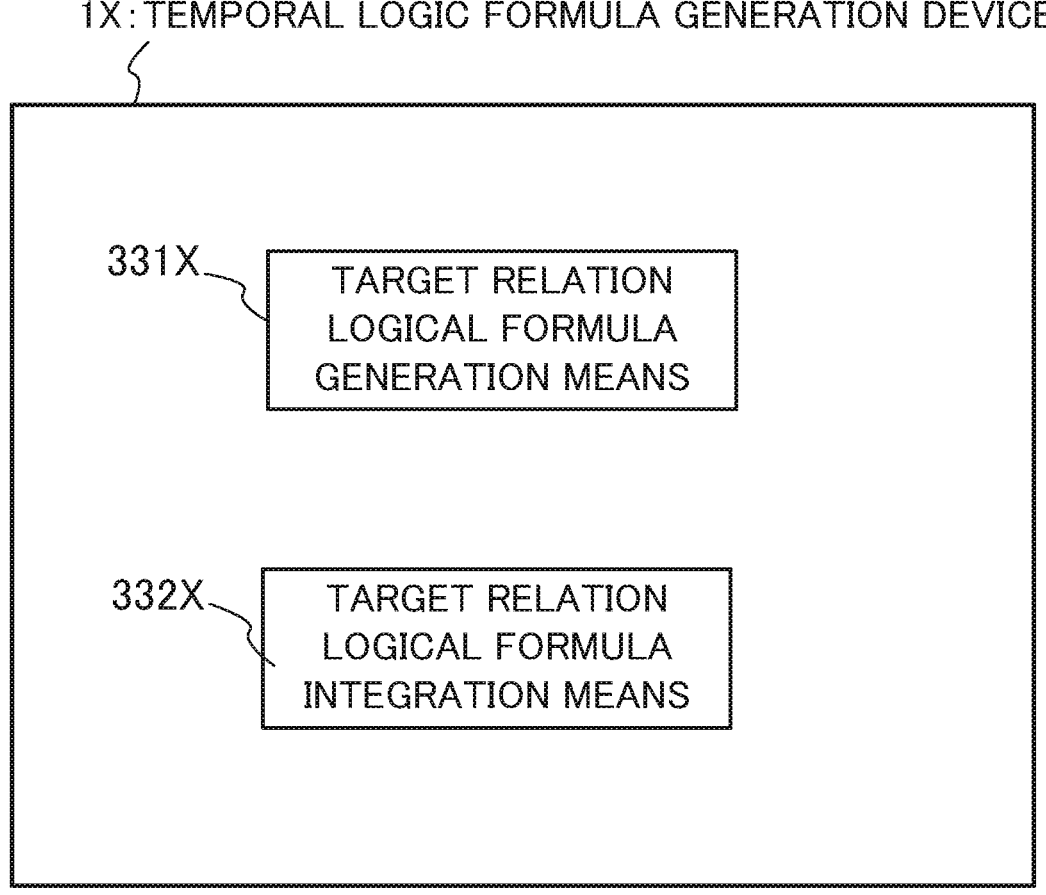
FIG. 13 It shows a schematic configuration of a temporal logic formula generation device in a second example embodiment.

FIG. 13 shows a schematic configuration diagram of a temporal logic formula generation device 1X according to the second example embodiment. The temporal logic formula generation device 1X mainly includes a target relation logical formula generation means 331X and a target relation logical formula integration means 332X. The temporal logic formula generation device 1X may be configured by a plurality of devices. Examples of the temporal logic formula generation device 1X include the robot controller 1 in the first example embodiment.

The target relation logical formula generation means 331X is configured to generate, based on object-to-object relation information representing a relation between objects in a target state relating to a task of the robot, one or more target relation logical formulas that are temporal logic formulas representing relations, in the target state, between respective pair(s) of objects between which the relation is defined. Examples of the target relation logical formula generation means 331X include the target relation logical formula generation unit 331 in the first example embodiment.

The target relation logical formula integration means 332X is configured to generate a temporal logic formula into which the target relation logical formulas are integrated. Examples of the target relation logical formula integration means 332X include the target relation logical formula integration unit 332 in the first example embodiment.

After the process by the target relation logical formula integration means 332X, for example, the temporal logic formula generation device 1X or another device to which the integrated target relation logical formulas are supplied from the temporal logic formula generation device 1X reflects the integrated target relation logical formulas in a constraint condition or an evaluation function to be used in optimization process. Then, a target trajectory relating to the robot is calculated by optimization using the constraint condition and the evaluation function, and further, the control command for the robot is generated based on the target trajectory. In this situation, for example, by representing skills in the abstract space by the skills information Isn extracted from the skills database I4 as in the first example embodiment, join and release operations between the objects may be realized. In another example, the join and release operations between objects may be represented by the switching of the constraint switch variable η between ON and OFF without using the skills. The temporal logic formula generated by the temporal logic formula generation device 1X is not limited to a formula specifying only the task of the robot. Instead, it may include the content relating to a human task.

Figure 14:
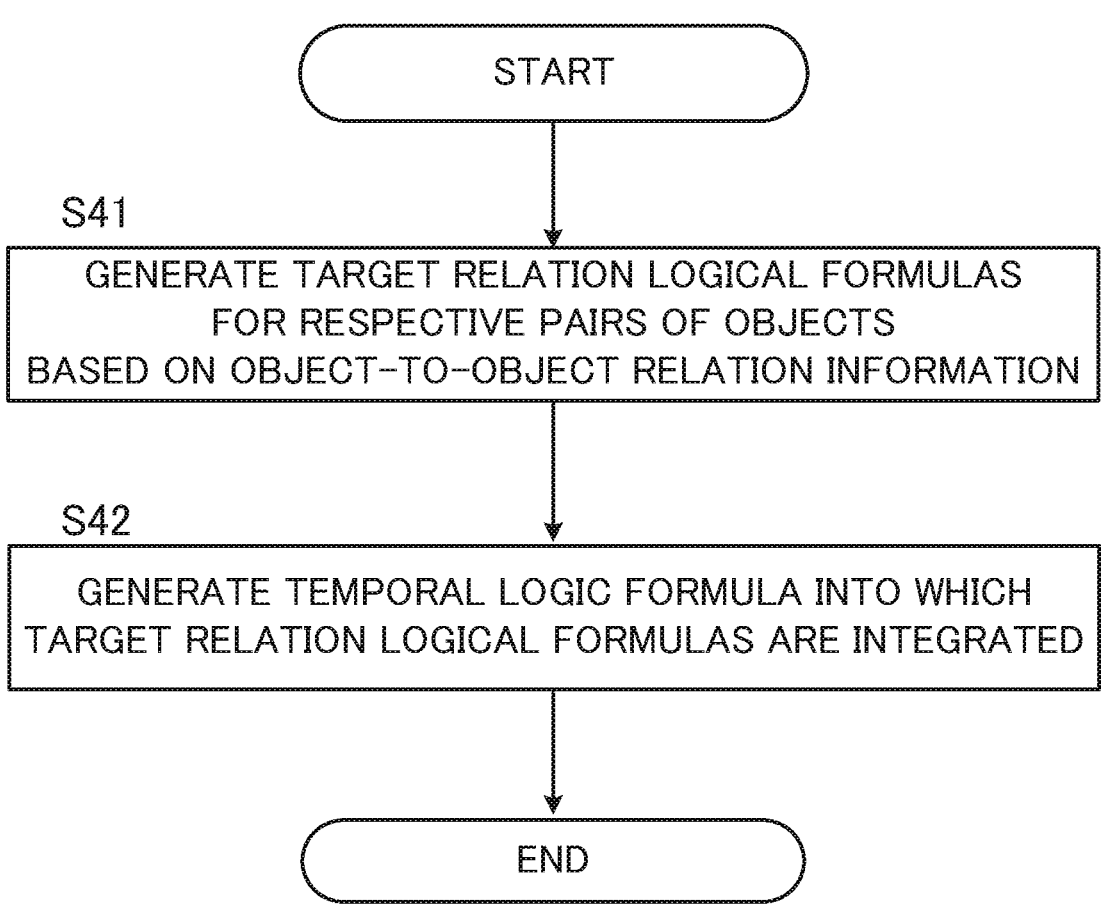
FIG. 14 It shows an example of a flowchart to be executed by the temporal logic formula generation device in the second example embodiment.

FIG. 14 is an example of a flowchart in the second example embodiment. The target relation logical formula generation means 331X generates, based on object-to-object relation information representing a relation between objects in a target state relating to a task of the robot, one or more target relation logical formulas that are temporal logic formulas representing relations, in the target state, between respective pair(s) of objects between which the relation is defined (step S41). The target relation logical formula integration means 332X is configured to generate a temporal logic formula into which the target relation logical formulas are integrated (step S42).

According to the second example embodiment, the temporal logic formula generation device 1X can suitably generate a temporal logic formula representing an object-to-object relation in a target state related to the task of the robot. Then, the temporal logic formula generated by the temporal logic device 1X is suitably used for the motion planning of the robot.

Third Example Embodiment

Figure 15:
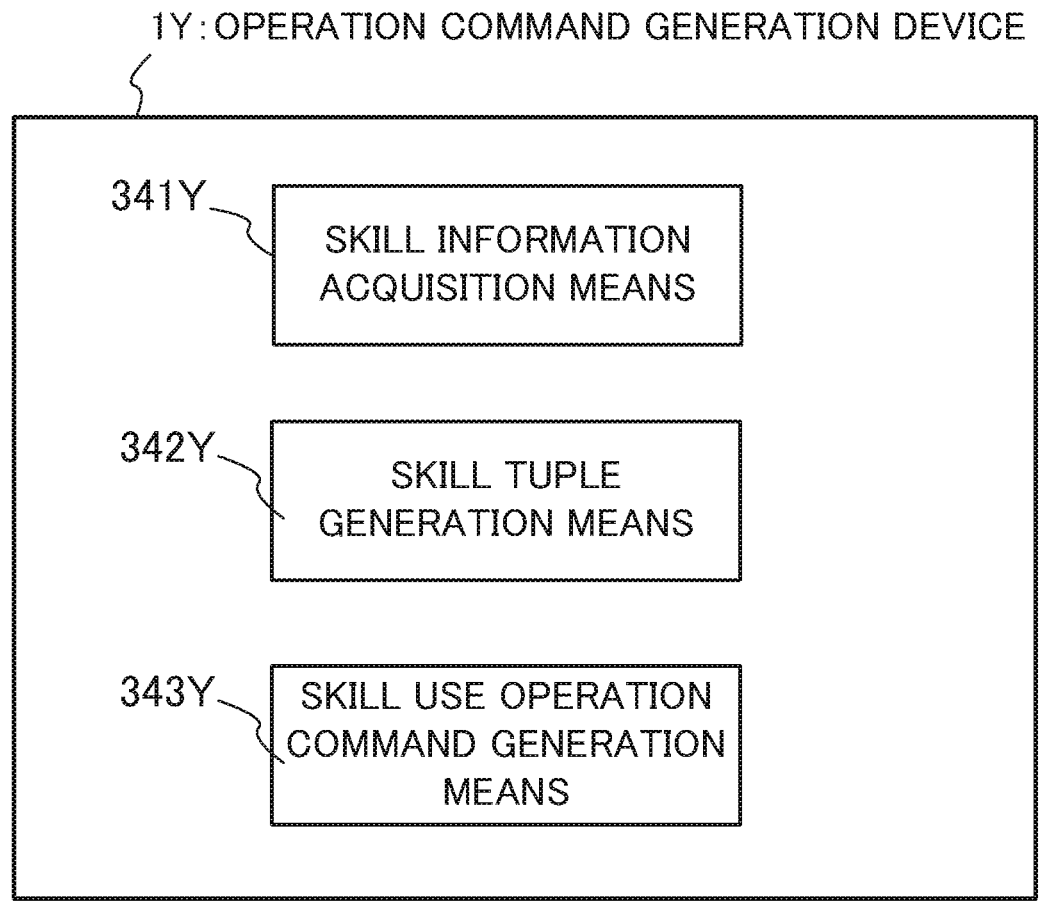
FIG. 15 It shows a schematic configuration of an operation command generation device in a third example embodiment.

FIG. 15 shows a schematic configuration diagram of an operation command generation device 1Y in the third example embodiment. The operation command generation device 1Y mainly includes a skill information acquisition means 341Y, a skill tuple generation means 342Y, and a skill use operation command generation means 343Y. The operation command generation device 1Y may be configured by a plurality of devices. Examples of the operation command generation device 1Y include the robot controller 1 in the first example embodiment.

The skill information acquisition means 341Y is configured to acquire skill information relating to a skill to be used in a motion planning of a robot. Examples of the skill information acquisition unit 341Y include the skill information acquisition unit 341 in the first example embodiment.

The skill tuple generation means 342Y is configured to generate, based on the skill information, a skill tuple which is a set of variables in a system model, the variables being associated with the skill, the system model being set in the motion planning. Examples of the above system model include the system model Mb in the first example embodiment. Further, examples of the skill tuple generation means 342Y include the skill tuple generation unit 342 in the first example embodiment.

The skill use operation command generation means 343Y is configured to generate a skill use operation command that is a temporal logic command representing an operation corresponding to the skill tuple. Examples of the skill use operation command generation means 343Y include the skill use operation command generation unit 343 in the first example embodiment.

Figure 16:
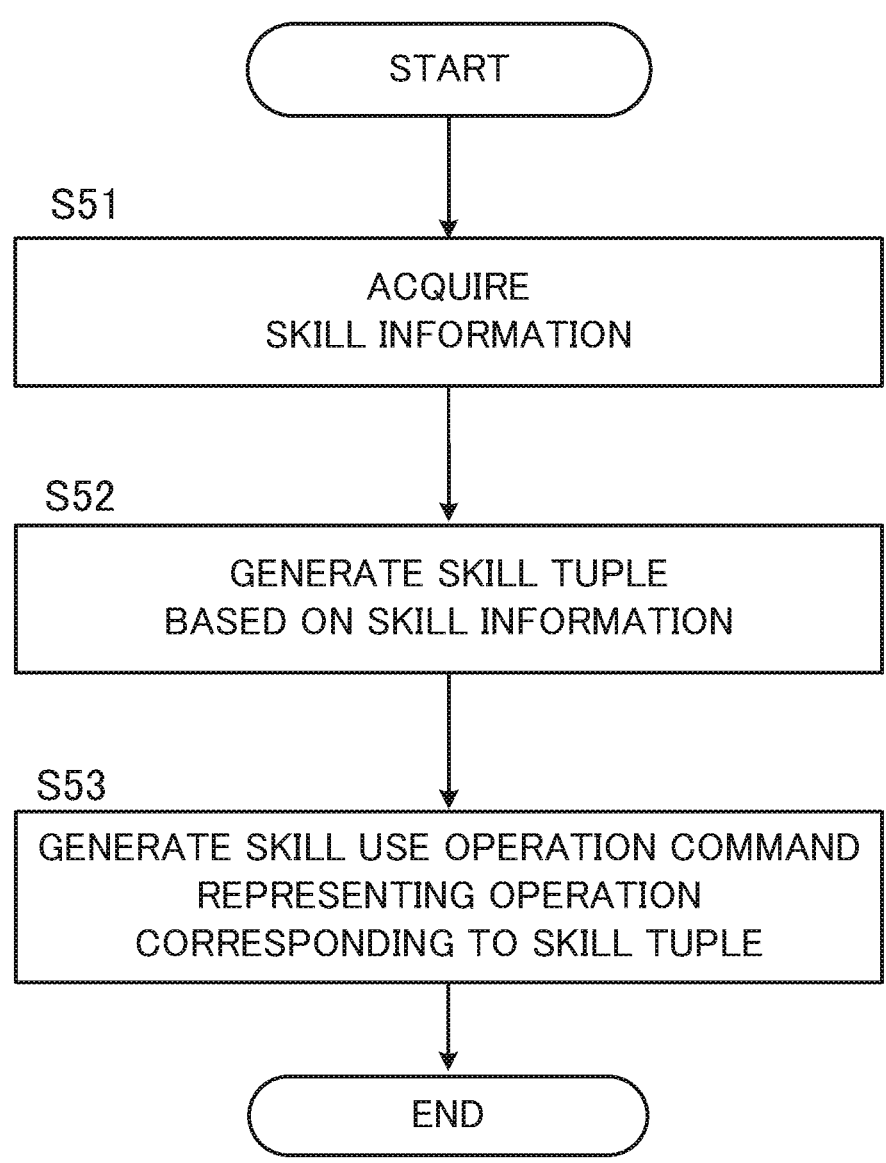
FIG. 16 It shows an example of a flowchart to be executed by the operation command generation device in the third example embodiment.

FIG. 16 is an example of a flowchart in the third example embodiment. The skill information acquisition means 341Y acquires skill information relating to a skill to be used in a motion planning of a robot (step S51). The skill tuple generation means 342Y generates, based on the skill information, a skill tuple which is a set of variables in a system model set in the motion planning, the variables being associated with the skill, the system model being set in the motion planning (step S52). The skill use operation command generation means 343Y is configured to generate a skill use operation command that is a temporal logic command representing an operation corresponding to the skill tuple (step S53).

According to the third example embodiment, the operation command generation device 1Y can suitably generate an operation command for a motion planning using skill representation even in a task requiring complicated operations such as joining objects.

In the example embodiments described above, the program is stored by any type of a non-transitory computer-readable medium (non-transitory computer readable medium) and can be supplied to a control unit or the like that is a computer. The non-transitory computer-readable medium include any type of a tangible storage medium. Examples of the non-transitory computer readable medium include a magnetic storage medium (e.g., a flexible disk, a magnetic tape, a hard disk drive), a magnetic-optical storage medium (e.g., a magnetic optical disk), CD-ROM (Read Only Memory), CD-R, CD-R/W, a solid-state memory (e.g., a mask ROM, a PROM (Programmable ROM), an EPROM (Erasable PROM), a flash ROM, a RAM (Random Access Memory)). The program may also be provided to the computer by any type of a transitory computer readable medium. Examples of the transitory computer readable medium include an electrical signal, an optical signal, and an electromagnetic wave. The transitory computer readable medium can provide the program to the computer through a wired channel such as wires and optical fibers or a wireless channel.

The whole or a part of the example embodiments described above can be described as, but not limited to, the following Supplementary Notes.

While the invention has been particularly shown and described with reference to example embodiments thereof, the invention is not limited to these example embodiments. It will be understood by those of ordinary skilled in the art that various changes in form and details may be made therein without departing from the spirit and scope of the present invention as defined by the claims. In other words, it is needless to say that the present invention includes various modifications that could be made by a person skilled in the art according to the entire disclosure including the scope of the claims, and the technical philosophy. All Patent and Non-Patent Literatures mentioned in this specification are incorporated by reference in its entirety.

DESCRIPTION OF REFERENCE NUMERALS

1 Robot controller
1X Temporal logic formula generation device
1Y Operation command generation device
4 Storage device
5 Robot
7 Measurement device
41 Application information storage unit
100 Robot control system

What is claimed is:

1. A temporal logic formula generation device comprising:
   at least one memory configured to store instructions; and
   at least one processor configured to execute the instructions to:
      acquire object-to-object relation information representing relations between objects in a target state relating to a task of a robot with an end effector, wherein the objects include the end effector, a target object of operation by the end effector, and a reference object defined as a reference coordinate system, and wherein the relations include a first relation between a first pair of the end effector and the target object and a second relation between a second pair of the reference object and the target object;

generate, based on the object-to-object relation information, target relation logical formulas that are temporal logic formulas representing the first relation and the second relation in the target state;

generate an integrated temporal logic formula into which the target relation logical formulas are integrated; and generate a control command for the robot based on a target trajectory of the robot generated based on the integrated temporal logic formula.

2. The temporal logic formula generation device according to claim 1, wherein the object-to-object relation information represents the first relation and the second relation in the target state relating to contact, join, or release thereof and the second relation between the second pair in the target state relating to contact, join, or release thereof, and wherein the at least one processor is configured to execute the instructions to generate, as the target relation logical formulas, temporal logic formulas representing the first relation and the second relation relating to contact, join, or release thereof in the target state.

3. The temporal logic formula generation device according to claim 1, wherein the at least one processor is configured to execute the instructions to generate the target relation logical formulas which include a first logical formula representing presence or absence of constraint between the first pair and a second logical formula representing presence or absence of constraint between the second pair.

4. The temporal logic formula generation device according to claim 1, wherein the object-to-object relation information includes information on a relative positional relation between the objects in the target state, and wherein the at least one processor is configured to execute the instructions to generate the target relation logical formulas each of which includes a logical formula representing a constraint formula satisfying the relative positional relation.

5. The temporal logic formula generation device according to claim 1, wherein the at least one processor is configured to further execute the instructions to set an abstract state of objects existing in a workspace, wherein the at least one processor is configured to execute the instructions to generate the target relation logical formulas each of which includes a logical formula representing a constraint formula in the abstract state.

6. The temporal logic formula generation device according to claim 1, wherein the at least one processor is configured to further execute the instructions to perform a motion planning of the robot through optimization using a constraint condition and an evaluation function relating to the task of the robot, wherein the integrated temporal logic formula is used to generate the constraint condition or the evaluation function.

7. The temporal logic formula generation device according to claim 6, wherein the at least one processor is configured to execute the instructions to generate the control command for the robot based on the target trajectory of the robot generated through the motion planning.

8. A temporal logic formula generation method comprising:

acquiring object-to-object relation information representing relations between objects in a target state relating to a task of a robot with an end effector, wherein the objects include the end effector, a target object of operation by the end effector, and a reference object defined as a reference coordinate system, and wherein the relations include a first relation between a first pair of the end effector and the target object and a second relation between a second pair of the reference object and the target object;

generating, based on the object-to-object relation information, target relation logical formulas that are temporal logic formulas representing the first relation and the second relation in the target state;

generating an integrated temporal logic formula into which the target relation logical formulas are integrated; and generating a control command for the robot based on a target trajectory of the robot generated based on the integrated temporal logic formula.

9. A non-transitory computer readable storage medium storing a program executed by a computer, the program causing the computer to:

acquire object-to-object relation information representing relations between objects in a target state relating to a task of a robot with an end effector, wherein the objects include the end effector, a target object of operation by the end effector, and a reference object defined as a reference coordinate system, and wherein the relations include a first relation between a first pair of the end effector and the target object and a second relation between a second pair of the reference object and the target object;

generate, based on the object-to-object relation information, target relation logical formulas that are temporal logic formulas representing the first relation and the second relation in the target state;

generate an integrated temporal logic formula into which the target relation logical formulas are integrated; and generate a control command for the robot based on a target trajectory of the robot generated based on the integrated temporal logic formula.

\* \* \* \* \*